US009331774B2

(12) United States Patent
Chen et al.

(10) Patent No.: US 9,331,774 B2
(45) Date of Patent: May 3, 2016

(54) SYSTEMS AND METHODS FOR SEGMENTING A SATELLITE FIELD OF VIEW FOR DETECTING RADIO FREQUENCY SIGNALS

(75) Inventors: Weiguo Chen, Cambridge (CA); Arunas Gabriel Macikunas, Cambridge (CA)

(73) Assignee: exactEarth Ltd., Cambridge (CA)

(*) Notice: Subject to any disclaimer, the term of this patent is extended or adjusted under 35 U.S.C. 154(b) by 213 days.

(21) Appl. No.: 12/797,066

(22) Filed: Jun. 9, 2010

(65) Prior Publication Data

US 2011/0304502 A1 Dec. 15, 2011

(51) Int. Cl.
*H04B 7/185* (2006.01)
*H01Q 3/00* (2006.01)
*G08G 3/02* (2006.01)

(52) U.S. Cl.
CPC .......... *H04B 7/1851* (2013.01); *G08G 3/02* (2013.01); *H01Q 3/00* (2013.01)

(58) Field of Classification Search
IPC .............. H04B 7/1851; G08G 3/02; H01Q 3/00
See application file for complete search history.

(56) References Cited

U.S. PATENT DOCUMENTS

| | | | |
|---|---|---|---|
| 3,307,188 A | 2/1967 | Marchetti et al. | |
| 3,725,938 A * | 4/1973 | Black et al. | 342/435 |
| 3,825,928 A | 7/1974 | Williams | |
| 3,842,417 A | 10/1974 | Williams | |
| 4,023,170 A | 5/1977 | Buss | |
| 4,028,699 A | 6/1977 | Stevens | |
| 4,114,142 A | 9/1978 | Wycoff et al. | |
| 4,129,873 A | 12/1978 | Kennedy | |
| 4,276,551 A | 6/1981 | Williams et al. | |
| 4,359,733 A | 11/1982 | O'Neill | |
| 5,029,184 A | 7/1991 | Andren et al. | |
| 5,103,461 A | 4/1992 | Tymes et al. | |
| 5,132,694 A | 7/1992 | Sreenivas | |
| 5,142,550 A | 8/1992 | Tymes et al. | |

(Continued)

FOREIGN PATENT DOCUMENTS

| | | |
|---|---|---|
| AU | 2008258219 | 1/2013 |
| AU | 2013200747 A1 | 3/2013 |

(Continued)

OTHER PUBLICATIONS

Wikepedia Article, "Analog-to-Digital Converter", Jun. 7, 2009 version.*

(Continued)

*Primary Examiner* — Tashiana Adams
*Assistant Examiner* — Fred H Mull
(74) *Attorney, Agent, or Firm* — Bereskin & Parr LLP; Isis E. Caulder

(57) ABSTRACT

A satellite system for detecting radio frequency signals from space including at least two sensors, a processing unit and at least one receiver. Each sensor receives a plurality of radio frequency signals containing messages and outputs a sensor signal that is representative of the plurality of radio frequency signals. The processing unit selects a predetermined number of mathematical combinations of the sensor signals and combines the sensor signals into the predetermined number of mathematical combinations to produce a plurality of zone signals. The characteristics of each zone signal are undefined at the time the predetermined number of mathematical combinations is selected. The receiver extracts the messages contained in the zone signals.

35 Claims, 15 Drawing Sheets

(56) References Cited

U.S. PATENT DOCUMENTS

| | | | |
|---|---|---|---|
| 5,151,706 A * | 9/1992 | Roederer et al. | 342/372 |
| 5,157,687 A | 10/1992 | Tymes et al. | |
| 5,233,358 A | 8/1993 | Murphy | |
| 5,280,498 A | 1/1994 | Tymes et al. | |
| 5,359,521 A | 10/1994 | Kyrtsos et al. | |
| 5,375,059 A | 12/1994 | Kyrtsos et al. | |
| 5,379,448 A * | 1/1995 | Ames et al. | 455/524 |
| 5,390,125 A | 2/1995 | Sennott et al. | |
| 5,401,944 A | 3/1995 | Bravman et al. | |
| 5,420,809 A | 5/1995 | Read et al. | |
| 5,438,517 A | 8/1995 | Sennott et al. | |
| 5,442,558 A | 8/1995 | Kyrtsos et al. | |
| 5,479,441 A | 12/1995 | Tymes et al. | |
| 5,490,073 A | 2/1996 | Kyrtsos | |
| 5,506,587 A * | 4/1996 | Lans | 342/357.31 |
| 5,528,221 A | 6/1996 | Jeuch et al. | |
| 5,528,621 A | 6/1996 | Heiman et al. | |
| 5,550,743 A | 8/1996 | Kyrtsos | |
| 5,555,503 A | 9/1996 | Kyrtsos et al. | |
| 5,579,016 A | 11/1996 | Wolcott et al. | |
| 5,629,855 A | 5/1997 | Kyrtsos et al. | |
| 5,668,803 A | 9/1997 | Tymes et al. | |
| 5,706,313 A | 1/1998 | Blasiak et al. | |
| 5,754,139 A | 5/1998 | Turcotte et al. | |
| 5,815,811 A | 9/1998 | Pinard et al. | |
| 6,002,918 A | 12/1999 | Heiman et al. | |
| 6,011,512 A | 1/2000 | Cohen | |
| 6,044,323 A | 3/2000 | Yee et al. | |
| 6,104,978 A | 8/2000 | Harrison et al. | |
| 6,148,040 A | 11/2000 | Nguyen et al. | |
| 6,185,427 B1 | 2/2001 | Krasner et al. | |
| 6,236,354 B1 | 5/2001 | Krasner | |
| 6,298,242 B1 | 10/2001 | Schiff | |
| 6,314,269 B1 | 11/2001 | Hart et al. | |
| 6,370,126 B1 | 4/2002 | De Baere et al. | |
| 6,374,104 B1 | 4/2002 | Croq et al. | |
| 6,421,000 B1 | 7/2002 | McDowell | |
| 6,427,121 B2 | 7/2002 | Brodie | |
| 6,512,720 B1 | 1/2003 | Yang | |
| 6,522,301 B2 | 2/2003 | Takayama et al. | |
| 6,522,643 B1 | 2/2003 | Jacomb-Hood et al. | |
| 6,611,757 B2 | 8/2003 | Brodie | |
| 6,658,349 B2 | 12/2003 | Cline | |
| 6,738,358 B2 | 5/2004 | Bist et al. | |
| 6,813,263 B1 | 11/2004 | Margherita | |
| 6,823,170 B1 | 11/2004 | Dent | |
| 7,047,114 B1 | 5/2006 | Rogers | |
| 7,205,933 B1 | 4/2007 | Snodgrass | |
| 7,265,713 B2 | 9/2007 | Lewis | |
| 7,317,916 B1 | 1/2008 | Chang et al. | |
| 7,526,249 B2 | 4/2009 | Waltman et al. | |
| 7,594,260 B2 | 9/2009 | Porras et al. | |
| 7,876,865 B2 | 1/2011 | Peach | |
| 8,295,325 B2 | 10/2012 | Guey | |
| 8,374,292 B2 | 2/2013 | Peach | |
| 2002/0061073 A1 | 5/2002 | Huang et al. | |
| 2003/0017827 A1 | 1/2003 | Ciaburro et al. | |
| 2004/0039504 A1 | 2/2004 | Coffee et al. | |
| 2004/0166807 A1 | 8/2004 | Vesikivi et al. | |
| 2004/0174895 A1 | 9/2004 | Hiraoka | |
| 2004/0183673 A1 | 9/2004 | Nageli | |
| 2004/0193367 A1 | 9/2004 | Cline | |
| 2004/0217000 A1 | 11/2004 | Yamamoto et al. | |
| 2004/0217900 A1 | 11/2004 | Martin et al. | |
| 2005/0060739 A1 | 3/2005 | Verna | |
| 2005/0124291 A1 | 6/2005 | Hart et al. | |
| 2005/0248486 A1 | 11/2005 | Lee et al. | |
| 2005/0271000 A1 | 12/2005 | Schulist | |
| 2006/0087456 A1 | 4/2006 | Luby | |
| 2006/0107192 A1 | 5/2006 | Mantha et al. | |
| 2006/0109106 A1 | 5/2006 | Braun | |
| 2006/0114862 A1 | 6/2006 | Hiraoka | |
| 2006/0129288 A1 | 6/2006 | Yanagi | |
| 2006/0199612 A1 | 9/2006 | Beyer et al. | |
| 2006/0205370 A1 | 9/2006 | Hayashi et al. | |
| 2008/0086267 A1 | 4/2008 | Stolte et al. | |
| 2008/0088485 A1 | 4/2008 | Stolte et al. | |
| 2008/0220771 A1 | 9/2008 | Agarwal et al. | |
| 2008/0268775 A1 * | 10/2008 | Bishop | 455/13.3 |
| 2008/0304597 A1 | 12/2008 | Peach | |
| 2009/0072921 A1 * | 3/2009 | Schmid | 332/145 |
| 2009/0161797 A1 | 6/2009 | Cowles et al. | |
| 2010/0061427 A1 | 3/2010 | Lopez-Risueno et al. | |
| 2010/0117903 A1 | 5/2010 | Zheng | |
| 2011/0075602 A1 | 3/2011 | Peach et al. | |
| 2011/0304502 A1 | 12/2011 | Chen et al. | |

FOREIGN PATENT DOCUMENTS

| | | | |
|---|---|---|---|
| CA | 2653203 A1 | 12/2007 | |
| CA | 2687322 A1 | 12/2008 | |
| CA | 2715155 A1 | 3/2011 | |
| EP | 1202388 A2 | 5/2002 | |
| EP | 2024754 A2 | 2/2009 | |
| EP | 2211486 B1 | 1/2013 | |
| EP | 2302821 | 6/2013 | |
| EP | 2651046 A2 | 10/2013 | |
| JP | 2003109200 A | 4/2003 | |
| JP | 2005181078 A | 7/2005 | |
| WO | 0209318 A2 | 1/2002 | |
| WO | WO03/046603 | 6/2003 | |
| WO | 2004010572 A1 | 1/2004 | |
| WO | WO2007/143478 | 12/2007 | |
| WO | WO2008/148188 | 12/2008 | |
| WO | 2013152427 A1 | 10/2013 | |

OTHER PUBLICATIONS

J. Ward et al., High throughput slotted ALOHA packet radio networks with adaptive arrays, IEEE Transactions on Communications, vol. 41(3), p. 460-470, 1993.*

P. Lehne et al., An Overview of Smart Antenna Technology for Mobile Communications Systems, IEEE Communications Surveys, vol. 2(4), p. 2-13, 1999.*

A. Jacobsen, Smart Antennas for Dummies, Telenor R&D Report, Jan. 2001.*

"Space-Based AIS Receiver for Maritime Traffic Monitoring Using Interference Cancellation", Jun. 30, 2006, Master of Science in Communication Technology, pp. 1-107.

Extended European Search Report for Application No. EP10192812 dated Apr. 11, 2011.

Extended European Search Report dated May 26, 2010 for Application No. 08748111.5-2411/2156207.

European Examination Report dated Mar. 8, 2011 and European Search Report dated Aug. 12, 2009 for Application No. 09 250 993.4-2411.

Written Submissions dated Jun. 13, 2012, European Application No. 09250993.4.

Examiner's Result of Consultation dated Jun. 27, 2012, European Application No. 09250993.4.

Notice of Intent to Grant dated Jul. 25, 2012, European Application No. 09250993.4.

Office Action dated Apr. 1, 2011, Australian Application No. 2008258219.

Office Action dated Apr. 4, 2012, Australian Application No. 2008258219.

Office Action dated Dec. 29, 2011, Indonesian Application No. W00200903348.

European Communication dated Aug. 2, 2010, European Application No. 09250993.4.

Notice of Allowance dated Oct. 1, 2010, U.S. Appl. No. 11/760,358.

Notice of Abandonment dated Feb. 8, 2012, U.S. Appl. No. 12/360,473.

Examiner Interview Summary dated Oct. 1, 2010, U.S. Appl. No. 11/760,358.

Amendment dated Jul. 14, 2010, U.S. Appl. No. 11/760,358.

Office Action dated Apr. 14, 2010, U.S. Appl. No. 11/760,358.

"Coast Guard looks to space for maritime awareness", U.S. Coast Guard Press Release, Jan. 24, 2007.

(56) References Cited

OTHER PUBLICATIONS

Comments of the National Telecommunications and Information Administration before the Federal Communications Commission on Dec. 1, 2006.
FFI Facts—Space-based Surveillance, Apr. 2005.
Satellite AIS from USCG, Digital Ship, Apr. 2007, p. 26.
Cairns, "AIS and Long Range Identification & Tracking", Journal of Navigation, paper presented on Nov. 9, 2004, pp. 181-189, v. 58, Royal Institute of Navigation.
Maritime Safety and Surveillance Initiative presentation dated Apr. 2005.
Molessa, "Satellite Ais for Long Range Identification & Tracking", seminar dated Nov. 3-5, 2004.
ITU Radio Communication Study Groups Document 8B/242-E dated Sep. 9, 2005.
Tetrault, "Use of AIS for Maritime Domain Awareness", presentation dated Oct. 17, 2005.
Wahl et al., "New possible roles of small satellites in maritime surveillance", Acta Astronautica, 2004, pp. 273-277, v. 59, Elsevier.
Eriksen et al., "Maritime traffic monitoring using a space-based AIS receiver", paper presented at 55th International Astronautical Congress 2004, Vancouver, Canada.
Høye et al., "Space-based AIS for global maritime traffic monitoring", pre-print from 5th IAA Symposium on Small Satellites for Earth Observation, Apr. 4-8, 2005, Berlin.
Meland et al., "Maritime services for large-area surveillance using a space-based AIS receiver", Feb. 21, 2005.
Cairns, "AIS and Long Range Identification & Tracking", abstract published online on Apr. 18, 2005.
Wahl et al., "New possible roles of small satellites in maritime surveillance", abstract available online Nov. 17, 2004.
Short Messaging System Application Concepts Study, dated Jun. 30, 2005.
International Preliminary Report on Patentability dated Dec. 11, 2009, PCT Application No. PCT/CA2008000666.
PCT International Search Report and Written Opinion dated Jul. 24, 2008, PCT Application No. PCT/CA2008000666.
Preliminary Amendment dated Oct. 30, 2007, U.S. Appl. No. 11/760,358.
Previously co-pending U.S. Appl. No. 11/760,358 entitled, "System and Method for Decoding Automatic Identification System Signals" filed Jun. 8, 2007, now issued as Patent No. 7,876,865.
Co-pending U.S. Appl. No. 12/915,699, entitled "System and Method for Decoding Automatic Identification System Signals" filed Oct. 29, 2010.
Co-pending U.S. Appl. No. 12/360,473, entitled "Satellite Detection of Automatic Identification System Signals" filed Jan. 27, 2009.
Office Action dated Apr. 10, 2012, U.S. Appl. No. 12/915,699.
Høye et al., "Space-based AIS for global maritime traffic monitoring", Acta Astronautica, available online Sep. 17, 2007, pp. 240-245, v. 62, Elsevier.
Watching the watchers: satellite to demonstrate maritime surveillance for coast guard, Entrepreneur.com, Jan. 2008.
"AIS Satellites for Global Ship Tracking", gCaptain.com, dated Aug. 7, 2007.
Response and Disclaimer dated Jul. 9, 2012, U.S. Appl. No. 12/915,699.
Co-pending U.S. Appl. No. 12/567,104, entitled "Systems and Methods for Decoding Automatic Identification System Signals" filed Sep. 25, 2009.
Response dated Aug. 23, 2012, European Application No. 08748111.5.
Cervera, Miguel et al., "On the Performance Analysis of a Satellite-based AIS System", Signal Processing for Space Communications, 2008, SPSC 2008, 10th International Workshop ON, IEEE, Piscataway, NJ, USA, Oct. 6, 2008, pp. 1-8.
Naques, Malek et al., "Design of an Rf-subsampling Based Tri-band AIS and DSC Radio Receiver", Cognitive Radio and Advanced Spectrum Management, 2009, Second International Workshop ON, IEEE, Piscataway, NJ, USA, May 18, 2009, pp. 64-68.
Office Action dated Jul. 18, 2011, U.S. Appl. No. 12/360,473.
European Communication dated Dec. 19, 2011, European Application No. 10192812.5.
Response dated Jun. 13, 2012, European Application No. 10192812.5.
Amendment dated Mar. 1, 2010, European Application No. 08748111.5.
Response dated Oct. 8, 2010, European Application No. 08748111.5.
Office Action dated Apr. 17, 2012, European Application No. 08748111.5.
Office Action dated May 30, 2012, European Application No. 08748111.5.
EP Communication dated Jul. 27, 2012, European Application No. 08748111.5.
European Communication dated Apr. 11, 2012, European Application No. 10178715.8.
EP Search Report dated Mar. 5, 2012, European Application No. 10178715.8.
Response dated Oct. 1, 2010, European Application No. 09250993.4.
Response dated Aug. 23, 2011, European Application No. 09250993.4.
Summons to Attend Oral Proceedings dated Mar. 13, 2012, European Application No. 09250993.4.
Written Submissions dated Jun. 1, 2012, European Application No. 09250993.4.
European Office Action dated Sep. 10, 2012 for European Application No. 10192812.5.
Document relating to PCT Application No. PCT/CA2013/000341 dated Jul. 17, 2013 (International Search Report and Written Opinion).
Document relating to EP Application No. 087481114.5-1852 dated Aug. 19, 2013 (Intention to Grant).
Document relating to EP Application No 0192812.5, dated Feb. 24, 2014 (Office Action).
Document relating to EP 10192812.6, dated Oct. 31, 2014 (Summons to Attend Oral Proceedings).
Haynes, "A Primer on Digital Beamforming", <http://www.spectrumsignal.com/publications/beamform_primer.pdf>, pp. 1-15, dated Mar. 26, 1998.
Hoye et al, "Space-based AIS for Global Maritime Traffic Monitoring", pp. 1-240, dated Sep. 17, 2007.
Document relating to EP Application No. 10192812.5, dated Jan. 18, 2013 (Office Action Response).
Document relating to EP Application No. 10192812.5, dated Apr. 24, 2013 (Consultation by telephone).
Document relating to EP Application No. 10192812.5, dated Jun. 7, 2013 (Result of Consultation).
Document relating to EP Application No. 10192812.5, dated Aug. 22, 2013 (Response to Result of Consultation).
Document relating to U.S. Appl. No. 12/567,104, dated May 30, 2013 (Office Action).
Document relating to U.S. Appl. No. 12/567,104, dated Aug. 27, 2013 (Office Action Response).
Document relating to U.S. Appl. No. 12/567,104, dated Sep. 5, 2013 (Office Action).
Document relating to U.S. Appl. No. 12/567,104, dated Dec. 5, 2013 (Request for Continued Examination).
Euronav Navigation AI3000 AIS, <http://www.euronav.co.uk/Products/Hardware/AIS_Receivers/AIS3000/AIS3000/AI3000AIS_RX.htm>.
SR162 Professional AIS Receiver, <http://www.diytrade.com/china/4/products/254509/SR162_PROFESSIONAL_AIS_RECEIVER.html>, Oct. 2002.
Document relating to U.S. Appl. No. 12/915,699, dated Nov. 7, 2012 (Notice of Allowance).

* cited by examiner

SYSTEMS AND METHODS FOR SEGMENTING A SATELLITE FIELD OF VIEW FOR DETECTING RADIO FREQUENCY SIGNALS

FIELD

Embodiments described herein relate to systems and methods for segmenting a satellite field of view for detecting radio frequency signals. More particularly, embodiments described herein relate to systems and methods for segmenting a low earth orbit satellite field of view for receiving Automatic Identification System signals.

BACKGROUND

The Automatic Identification System (AIS) is a short-range (typically 20-46 nautical miles) tracking system used by ships and terrestrial marine traffic monitoring stations for identifying and locating ships. Each ship has an AIS transponder that automatically broadcasts short messages (up to 256 bits) at regular intervals. These messages may include information about the ship's identity, such as IMO number, call sign and name, UTC time, length, location, course over ground, speed over ground, and other details about the ship, it's movement or cargo. The messages are received by AIS transponders fitted on other ships or land-based monitoring stations. The frequency at which a ship transmits AIS messages is based on the state of the ship's motion. For example, ships that are anchored or are moving slowly transmit less frequently than those that are moving faster or are maneuvering.

AIS messages are typically transmitted on one or both of two Very High Frequency (VHF) channels centered at 161.975 MHz and 162.025 MHz and use 9600 bits/s Gaussian minimum shift keying (GMSK) modulation over 25 or 12.5 kHz channels using the High-level Data Link Control (HDLC) protocol. However, it will be evident to a person of skill in the art that future global and regional AIS systems may make use of additional frequencies. In the usual mode of operation, ship transmissions alternate between the two channels on a per transmission basis.

To ensure that VHF transmissions of different AIS transponders do not occur at the same time, the signals are time multiplexed using a technology called Self-Organizing Time Division Multiple Access (SOTDMA). Under SOTDMA each minute of time is divided into 2,250 equal time slots of 26.67 ms each. With a transmission speed of 9600 bits/s this translates into 256 bits per timeslot.

The time slots are typically synchronized accurately to Coordinated Universal Time (UTC) typically using Global Positioning System (GPS). Each AIS transponder determines its own transmission slot based upon the signal levels of AIS messages received from other ships and knowledge of future actions by other ships. Specifically, slot selection by an AIS transponder is randomized within a defined interval, and tagged with a random timeout of between 0 and 8 frames. When a ship changes its slot assignment, it announces both the new location and the timeout for that location. This self-organizing feature avoids signal collisions over the short ranges involved in surface transmissions and permits many ships to share the AIS frequencies efficiently.

The use of two AIS channels allows for up to 4500 messages per one-minute time frame. This capacity is relevant for a self-organized region determined by the broadcast range of the ship transponders (typically 20-46 nautical miles in radius). Where there are more ships in a particular broadcast range, the transponders will automatically reduce their receive range to reduce the size of the SOTDMA region. Specifically, under the SOTDMA CS protocol used with Class-B AIS transponders, a ship's transponder will start-up with a low signal level threshold of −107 dB. This means that the ship will accept or receive AIS signals with a signal level of −107 dB or greater. If a ship is unable to find an empty slot with this particular low signal level threshold (e.g. there are too many ships in this receive range), then the ship's transponder will incrementally step up the low signal level threshold until the transponder is able to find a free slot, or the low signal level threshold reaches −77 dB. In practice, this threshold is offset by a further 10 dB from the actual measured signal level. Class-A AIS transponders also co-ordinate their transmissions in a similar fashion, using received transmissions from other ships as well as shore-based AIS stations to utilize pre-allocated time slots that assigned to particular ships while within range of the shore-based AIS station. It should be noted that changes to the low signal level threshold do not affect the transmit range, as transmit power level is not changed. In most cases the transmitter power is fixed at about 2 W for Class-B, and 12.5 W for Class-A AIS transponders.

The use of AIS is now mandatory on all ships with a gross tonnage of 300 or more tons engaged on international voyages, and all passenger ships regardless of size or tonnage. It is estimated that more than 40,000 ships carry AIS equipment. AIS was originally conceived as an aid to navigation and safety, and also has potential security applications for monitoring maritime traffic. AIS signal detection could be achieved using coastal/ground stations, but the limited range of the VHF signals would require such coastal/ground stations to be situated at many locations along the coast, and even then, they could only monitor the immediate coastal region.

SUMMARY

Embodiments described herein relate generally systems and methods for segmenting a satellite field of view for detecting radio frequency signals. More particularly, embodiments described herein relate to systems and methods for segmenting a low earth orbit satellite field of view for receiving Automatic Identification System signals.

In one broad aspect there is provided a system for detecting radio frequency signals from space using a satellite, the system comprising:
 (a) at least two sensors, each sensor for
  (i) receiving a plurality of radio frequency signals, each radio frequency signal comprising at least one message; and
  (ii) outputting a sensor signal that is representative of the plurality of radio frequency signals;
 (b) a processing unit for:
  selecting a predetermined number of mathematical combinations of the sensor signals; and
  combining the sensor signals into the predetermined number of mathematical combinations to produce a plurality of zone signals, the characteristics of each zone signal being undefined at the time the predetermined number of mathematical combinations is selected; and
 at least one receiver for extracting the at least one message contained in the zone signals.

In one aspect there is provided a method for detecting radio frequency signals from space using a satellite, the method comprising:
 a) each of a plurality of sensors receiving a plurality of radio frequency signals, each radio frequency signal comprising at least one message;

b) each of the plurality of sensors outputting a sensor signal representative of the received AIS signals;

c) selecting a predetermined number of mathematical combinations of the sensor signals;

d) combining the sensor signals into the predetermined number of mathematical combinations to produce a plurality of zone signals, the characteristics of each zone signal being undefined at the time the predetermined number of mathematical combinations is selected; and e) extracting the at least one message contained in the zone signals.

Further aspects and advantages of the embodiments described herein will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
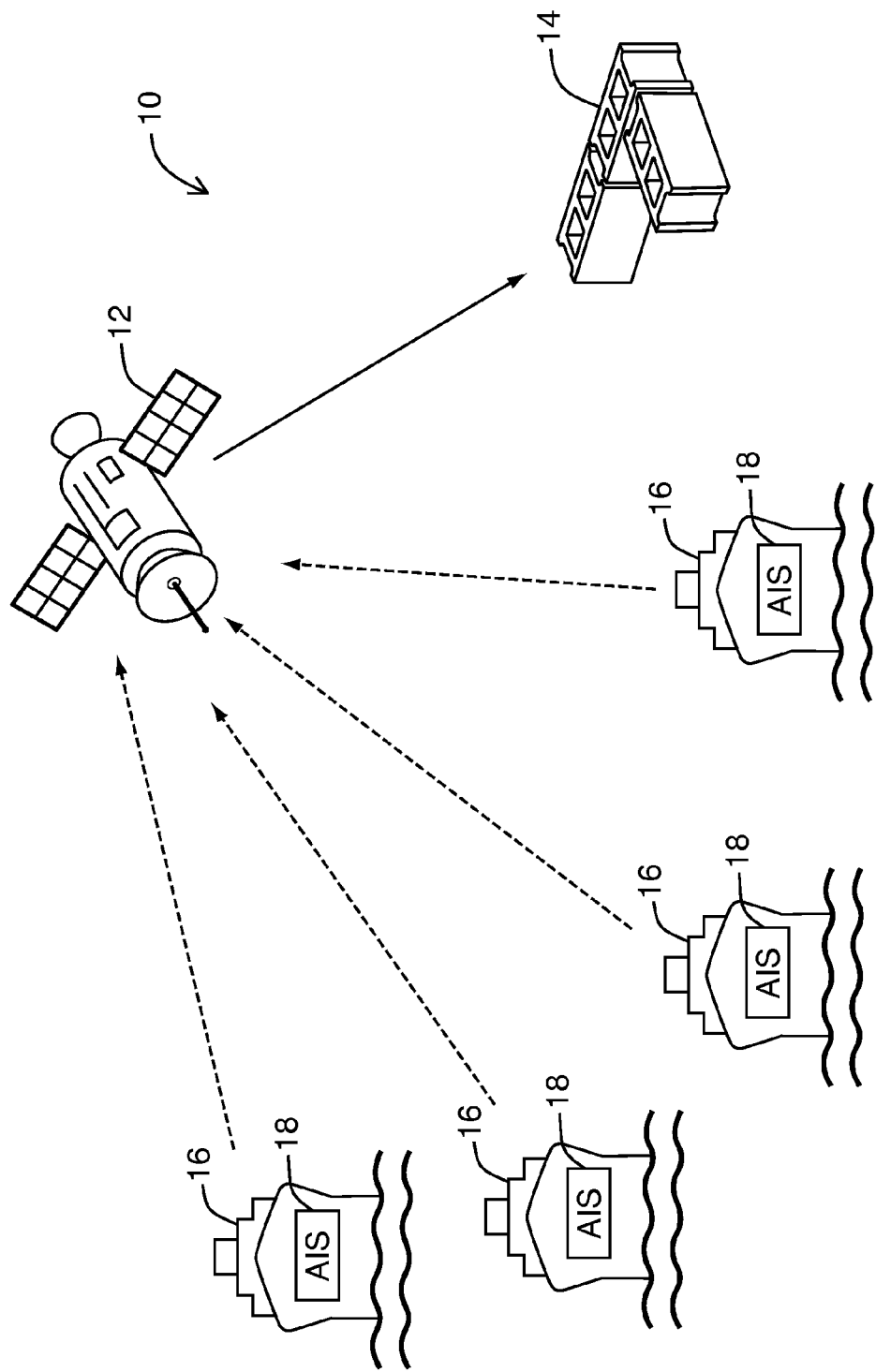
FIG. 1 is a schematic diagram of an AIS processing system including a low earth orbit satellite and a ground station.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Standard AIS transponders typically have a horizontal range that is highly variable but is typically limited to about 46 nautical miles (85 km). The vertical range of standard AIS transponders is, however, much greater and typically extends beyond the 400 km orbit of the International Space Station (ISS). Accordingly, AIS signals can be received and detected using low earth orbit (LEO) satellites.

Reference is now made to FIG. 1, which illustrates an AIS processing system 10 including a LEO satellite 12 and a ground station 14 for receiving and decoding AIS signals in accordance with an embodiment. FIG. 1 illustrates numerous ships 16 that each has an AIS transponder 18 for transmitting AIS signals that are received by the LEO satellite 12.

Typically, a given ship 16 will transmit AIS signals over two or more narrowband (i.e. 25 kHz) VHF channels. Examples of AIS VHF channels include AIS 1 at 161.975 MHz, AIS 2 at 162.025 MHz, and US AIS at 157.375 MHz. However, a person of skill in the art will understand that various other radio frequency channels could be used. For example, various regulatory bodies are currently studying new AIS frequencies for potential space-based and regional use.

To transmit the signal, the transmitting unit of the AIS transponder 18 employs a 9.6 kbps Gaussian minimum shift keying (GMSK) modulation, which is commonly known to imply that the AIS signal will be contained within a 14 kHz bandwidth. The LEO satellite 12 is equipped with at least one VHF antenna and receives the AIS signal transmitted by the ship 16. The LEO satellite 12 travels at a high velocity and consequently the AIS signal received by the LEO satellite 12 undergoes a Doppler shift. For example, a LEO satellite in a 700 km circular orbit travels at about 7,500 m/s resulting in a Doppler shift of up to +/−3.64 kHz at VHF frequencies.

The AIS signals received by the LEO satellite 12 will have a range of amplitudes, depending on the location of the ship 16 and its angular position as seen by the LEO satellite 12. Generally, the transmitting antenna used in the AIS transponder 18 of a given ship 16 does not radiate directly upwards, and this creates a reception hole directly underneath the LEO satellite 12. However, for most of the FOV (field of view) of the LEO satellite 12, the radiation patterns of the transmitting antenna of the AIS transponder 18 tend to balance the reduced signal strength caused by increased range, and the range of received signal amplitudes is relatively modest, and is most likely less than 10 dB for most of the FOV of the LEO satellite 12.

In some embodiments, the received AIS signals are processed at the LEO satellite 12 by an on-board receiver unit. The extracted messages are then downlinked to the ground station 14. In other embodiments, the LEO satellite 12 pre-processes all of the received AIS signals to create digital input data, which is downlinked to the ground station 14 where the digital input data is processed by a receiver unit.

In alternative embodiments, there may be more than one LEO satellite 12 that receives and pre-processes, or detects and decodes, the AIS signals. In addition, or alternatively, one or more ground stations 14 may be used to decode the pre-processed AIS signals. In another alternative, the processing required for detection and decoding can be separated between the LEO satellite 12 and the ground station 14; this scheme can also be extended to the cases in which there is more than one LEO satellite 12 and one ground station 14, one LEO satellite 12 and more than one ground station 14, or more than one LEO satellite 12 and more than one ground station 14. Accordingly, in these cases, data can be transmitted between the LEO satellite(s) and ground station(s) for processing in a variety of fashions. For simplicity, the embodiments described herein are with regards to a system with one LEO satellite 12 and one ground station 14, but the processing methodology can be extended to several LEO satellites and/or several ground stations. It is also conceivable that data inter-satellite links (ISL) amongst a constellation of LEO satellites could be employed. However, this is a very costly and complex approach, and, in practice, distribution of data via the terrestrial network is likely to be employed.

The AIS was initially designed for ship-to-ship and ship-to-shore aid to navigation and communication. Accordingly, satellite-based AIS systems have a unique set of issues. Specifically, the large field of view (FOV) of a LEO satellite means that the LEO satellite may receive signals from a large number of ships at once. This is particularly true as the LEO satellite passes over high volume shipping areas, which typically results in a large number of AIS signals colliding or overlapping with one another. Furthermore, the large FOV of a LEO satellite means that ships in the FOV may be very far from each other and at great distances the SOTDMA communication method is not effective at avoiding signal collisions. Propagation delays also affect accurate time synchronization.

Figure 2:
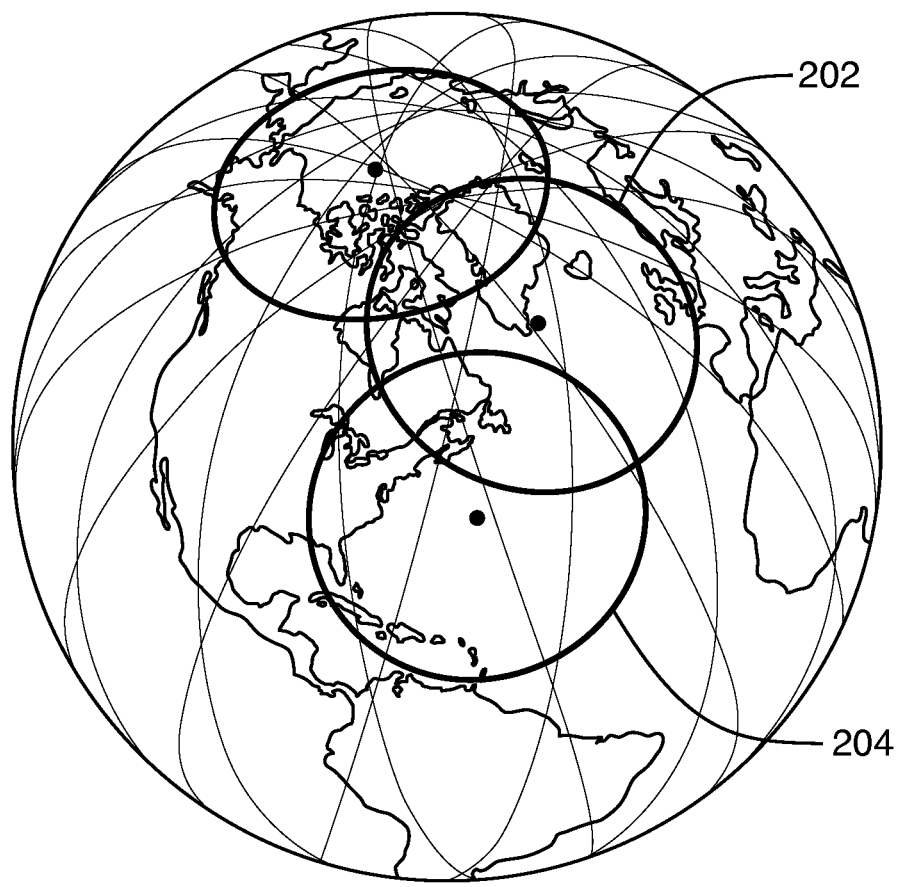
FIG. 2 is schematic diagram illustrating exemplary low earth orbit satellite fields of view.
Figure 3:
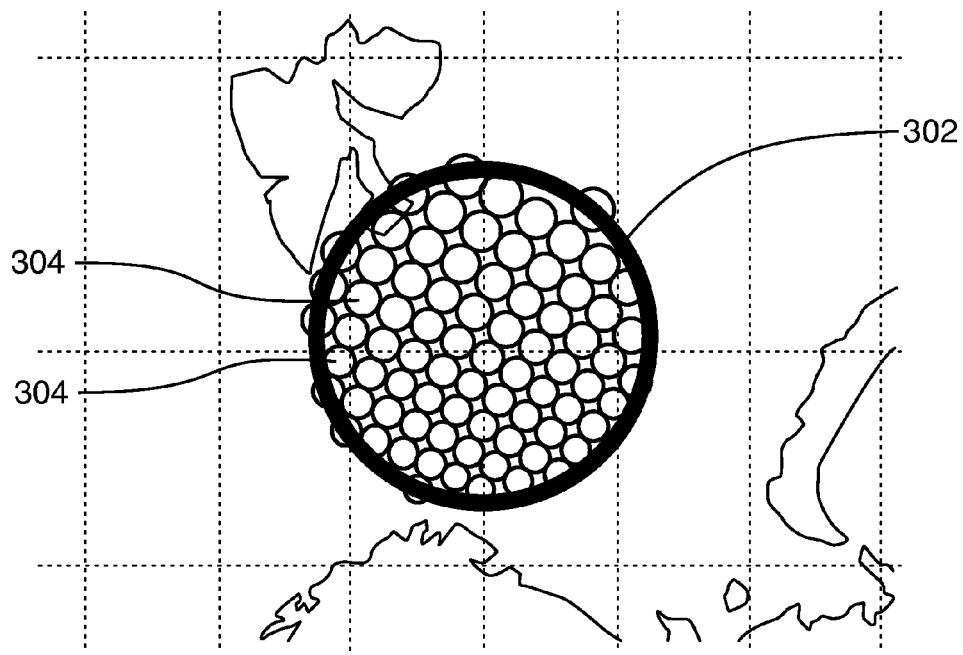
FIG. 3 is a schematic diagram illustrating an exemplary low earth orbit satellite field of view covering multiple SOTDMA cells.

Reference is now made to FIGS. 2 and 3. FIG. 2 illustrates typical fields of view 202 and 204 of LEO satellites. FIG. 3 illustrates a typical field of view 302 of a LEO satellite covering multiple SOTDMA cells 304.

Therefore, one problem encountered in LEO satellite-based AIS detection is that many of the AIS signals sent by ships will collide or overlap with one another. For example, it is estimated that there may be 2,000 ships in the FOV of a LEO satellite in moderate traffic areas. Each ship will typically send 10 AIS position reports per minute so for 2,000 ships a LEO satellite will receive 20,000 AIS signals per minute. This is a very large number compared to the number of available time slots (i.e. 4,500 across both VHF channels) and as a result, many AIS signals will collide with one another. Accordingly, the higher number of ships in the FOV, the higher number of collisions, and the more difficult it is for the LEO satellite to accurately detect the AIS signals.

Figure 4:
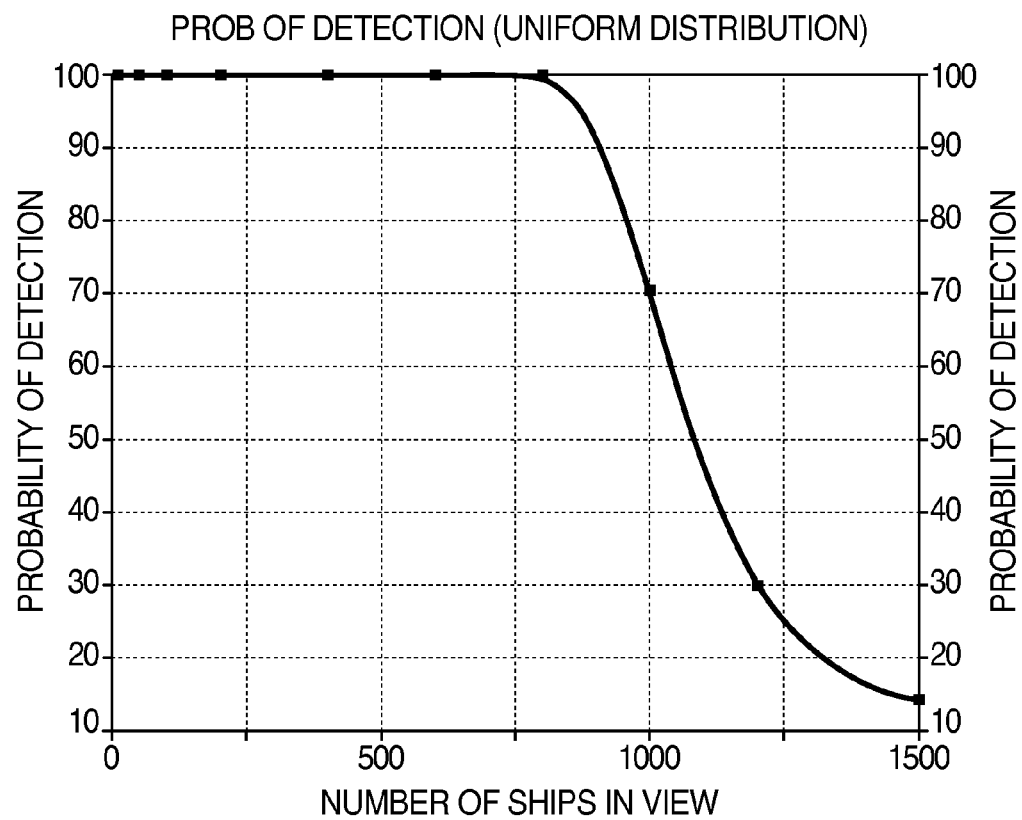
FIG. 4 is a graph illustrating the probability of a ship being detected by a low earth orbit satellite using a standard AIS receiver as a function of the number of ships in the field of view during a 10 minute period.

Reference is now made to FIG. 4 which illustrates the probability of a ship being detected by a LEO satellite using a standard AIS receiver as a function of the number of ships in the FOV during a 10 minute period. It can be seen from FIG. 4 that the detection performance drops to 35% where there are about 1,100 ships in the FOV during a 10-minute period. Accordingly, it appears that the detection threshold for a standard AIS receiver is 800 to 1000 ships in the FOV. Once this threshold is exceeded, the probability of detection drops dramatically. In busy shipping areas of the ocean, the number of ships in the FOV can easily exceed this number. For example, it is estimated that even for the mid-Atlantic area, which is characterized as having a moderate amount of shipping traffic, there are approximately 2,500 to 3,000 ships in a typical LEO satellite's FOV.

Accordingly, the performance of satellite-based AIS processing systems may be enhanced by dividing the large satellite FOV into a number of smaller segments so that the number of ships in each segment is less than the threshold. The segments are designed to cover the entire FOV so that the coverage area of the satellite is not reduced.

One known method of segmenting a satellite's FOV is to use classic phased arrays or feed arrays to form a large number of non-ambiguous spot beams. The goal is for each spot beam to have as uniform a radiation pattern as possible, typically maximizing energy received in the main lobe of each beam and reducing or eliminating side lobe energy. Major disadvantages of this solution include the high complexity and cost, and specifically for spaced-based applications, the size and mass.

Accordingly, there is a need for cost-effective and simple systems and methods for segmenting a satellite's FOV.

Figure 5:
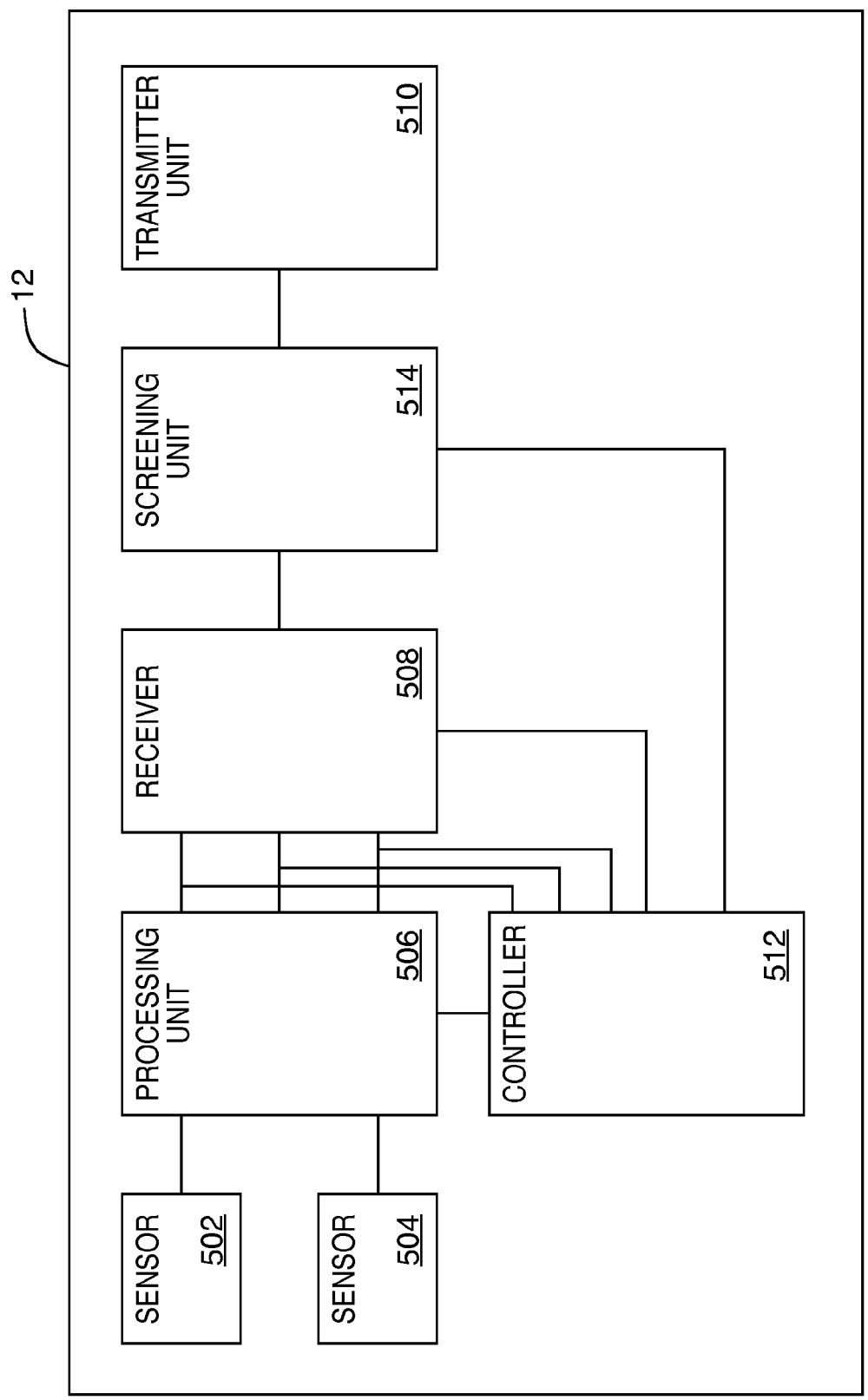
FIG. 5 a block diagram of the low earth orbit satellite of FIG. 1 including a processing unit and a controller in accordance with a first embodiment.

Reference is now made to FIG. 5 which is a block diagram of a LEO satellite 12 in accordance with a first embodiment. The LEO satellite 12 has a plurality of sensors and each sensor receives AIS signals transmitted by a plurality of ships 16 and outputs a sensor signal representative of the received AIS signals. The sensor signals are mathematically combined to produce a plurality of zone signals. The zone signals segment the satellite's FOV into a plurality of zones. The zone signals are then separately processed to extract the AIS messages contained therein. In the embodiment shown in FIG. 5, the LEO satellite 12 includes two sensors 502 and 504, a processing unit 506, a receiver 508 and a transmitter unit 510.

Each sensor 502 and 504 receives a plurality of AIS signals from the ships 16 and produces a sensor signal that is representative of the received AIS signals. The sensor signal is then forwarded to the processing unit 506 for zone processing. In some embodiments, the sensors 502 and 504 are RF (radio frequency) antennas. In these embodiments, the sensors 502 and 504 may be any type of RF antenna suitable for use on a LEO satellite. For example, the sensors 502 and 504 may be monopole antennas, patch antennas or helical antennas. Each antenna may be of the same type or different types. For example, one sensor (i.e. sensor 502) may be a patch antenna, and another sensor (i.e. sensor 504) may be a helical antenna.

In one embodiment, the sensors 502 and 504 are Very High Frequency (VHF) antennas configured to receive all AIS channel signals. In one embodiment, each sensor 502 and 504 is configured to receive AIS signals transmitted over AIS 1, AIS 2 and US AIS channels. In other embodiments, each sensor 502 and 504 is configured to receive AIS signals transmitted over AIS 1 and AIS 2 channels and one or more dedicated satellite AIS channels to be allocated.

In some embodiments, the sensors 502 and 504 are spatially separated from one another so that they receive different versions of the same signal. In some cases the sensors 502 and 504 are spatially separated on the same LEO satellite (i.e. LEO satellite 12). In other cases the sensors 502 and 504 are situated on at least two different satellites that form a satellite cluster.

In other embodiments, the sensors 502 and 504 may be polarized in a different manner. In some cases, the antennas may have different circular polarizations. For example, one sensor (i.e. first sensor 502) may be an antenna that has a right circular polarization, and another sensor (i.e. second sensor 504) may be an antenna that has a left circular polarization. In other cases, the antennas may have different linear polarizations. For example, one sensor (i.e. first sensor 502) may be an antenna that has a linear vertical polarization, and another sensor (i.e. sensor 504) may be an antenna that has a linear horizontal polarization. In still other cases, the sensors 502 and 504 may be antennas that have a mix of linear, elliptical (between linear and circular) and circular polarizations.

The processing unit 506 receives the plurality of sensor signals generated by the sensors 502 and 504 and mathematically combines them to produce a plurality of zone signals. The phrase "mathematical combination" will be used herein to describe a simple mathematical combination of two or more sensor signals. Each mathematical combination may be formed by (i) weighting or amplifying one or more of the sensor signals; and/or (ii) adjusting the phase of one or more of the sensor signals; and/or (iii) applying a delay to one or more of the sensor signals; and/or (iv) applying a transfer function to one or more of the sensor signals; and (v) summing the amplified, phase shifted, delayed, and/or transferred sensor signals to produce a zone signal.

Figure 6:
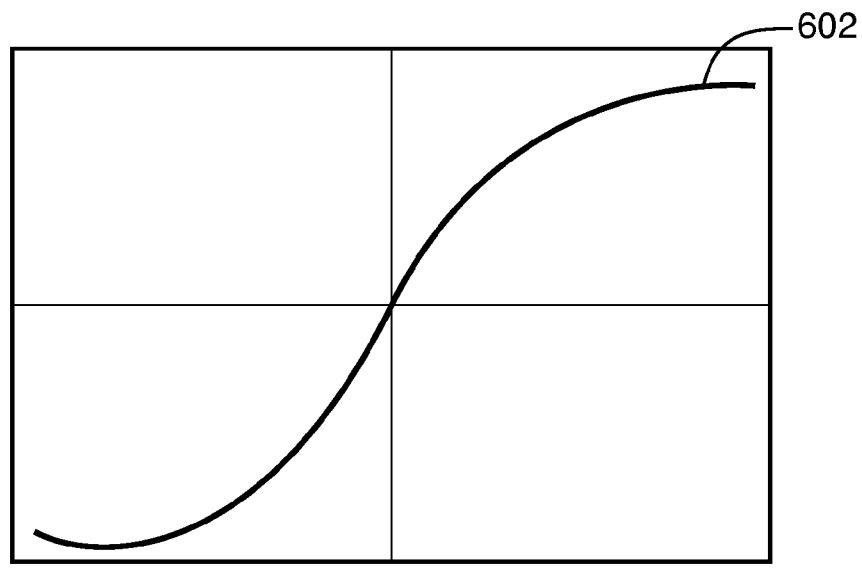
FIG. 6 is a graph illustrating a first non-linear function.
Figure 7:
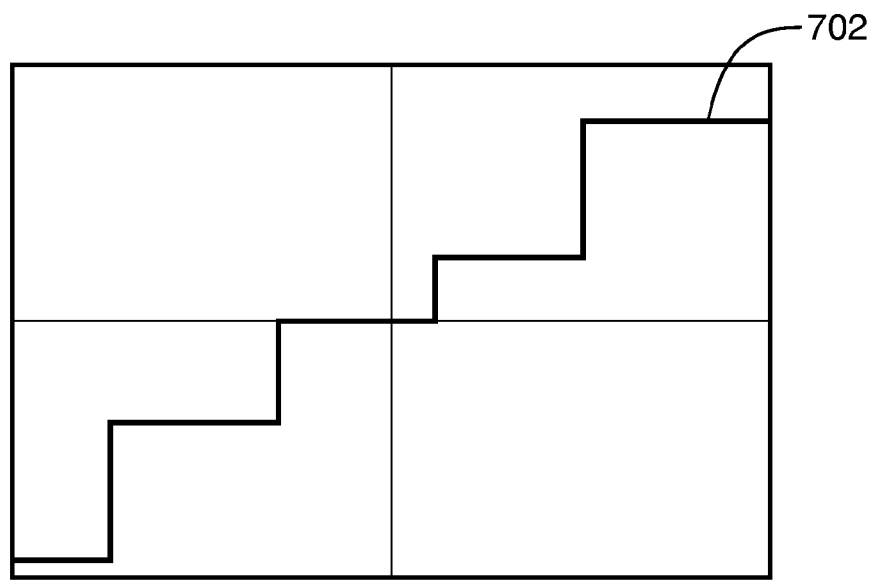
FIG. 7 is a graph illustrating a second non-linear function.

A transfer function is any function that has a defined output for a given input. The transfer function may apply linear or non-linear polynomials or algorithms such as a neural network. Reference is now made to FIGS. 6 and 7, which illustrate exemplary non-linear transfer functions that may be applied by the processing unit 506. Specifically, FIG. 6 illustrates a first exemplary non-linear transfer function 602 and FIG. 7 illustrates a second exemplary non-linear transfer function 702.

Where there are more than two sensors, thus more than two sensor signals, each mathematical combination does not have to include all of the sensor signals. For example, where there are four sensors, and thus four sensor signals, some mathematical combinations may be formed from only two of the sensor signals, whereas other mathematical combinations may be formed from all four sensor signals.

Unlike typical phased-arrays, which have a fixed number of valid signal combinations, there is virtually an unlimited number of suitable mathematical combinations for the systems and methods described herein. In some embodiments, the processing unit 506 may start with an initial number of mathematical combinations and increase or decrease the number of mathematical combinations based on the performance of the initial number of mathematical combinations. The processing unit 506 typically generates at least two mathematical combinations.

Each zone signal represents a portion of the FOV of the LEO satellite 12. Specifically, each zone signal represents a zone that is a segment of the FOV of the LEO satellite 12. In some embodiments, the zones segment the FOV of view by area such that the area of each zone is less than the area of the FOV. In other embodiments, the zones may segment the FOV by polarization, or any other suitable characteristic.

In traditional beam-forming (typically done using classic phased arrays) the objective is to form one or more beams with well defined characteristics. For example, the beams may be formed to have a consistent gain and polarization. In some cases one beam is formed and the weighting is adjusted for tracking purposes. In other cases multiple beams are formed through phasing (i.e. phase offsets). This can be contrasted from the zone-forming described herein. Specifically, the purpose of the zone-forming is not to define a particular beam or to track a particular signal, but to create a strong set of zone signals that will increase the number of AIS messages decoded. Accordingly, it can be said that zone-forming is results-based.

In most traditional phased array applications it is important that the characteristics (i.e. shape, size, coverage area) of each beam be well defined. For example, if the characteristics of the beams are well defined, knowing which beam the received signal came from may indicate the location of the source of the signal. Since AIS messages typically include information indicating the location of the transmitting ship it is not important to be able to determine the location of the source of the signal from the zone characteristics. Accordingly, in the systems and methods described herein the exact characteristics (i.e. shape, size, coverage area) of each zone need not be well defined. More particularly, in the systems and methods described herein the goal of the zone-forming process is not to generate zones with certain predetermined characteristics (e.g. shape, directivity, etc.), nor is it to generate a number of well-defined and non-overlapping zones. In contrast, the goal of the zone-forming processing is to segment the FOV into a plurality of zones that will maximize (or at least increase) the decoding capability of the satellite.

The zones generated by the processing unit 506 may be regular or irregular, overlapping or non-overlapping, unique or ambiguous, deterministic or random, static or adaptive, so long as the number of ships in each zone is less than the receiver detection threshold (i.e. 800-1000). This allows the processing unit 506 to be more compact and less expensive than a classic phased array and hence more compatible with small satellite usage.

Preferably, each zone signal is at least partially statistically independent from the other zone signals. Two zone signals are said to be statistically independent if knowing something about one zone signal does not yield any information about the other zone signal. The more statistically independent the zone signals, the more unique each zone. The more unique each zone, the greater number of unique messages being detected. The statistical independence of two signals can be determined by assessing the statistical similarity of the two signals. The statistical similarity of two zone signals may be assessed, for example, using time domain signal cross-correlation, or cross-covariance of the two signals. The assessment may also be performed, for example, on the phase or the frequency spectrum of the zone signals.

Figure 8:
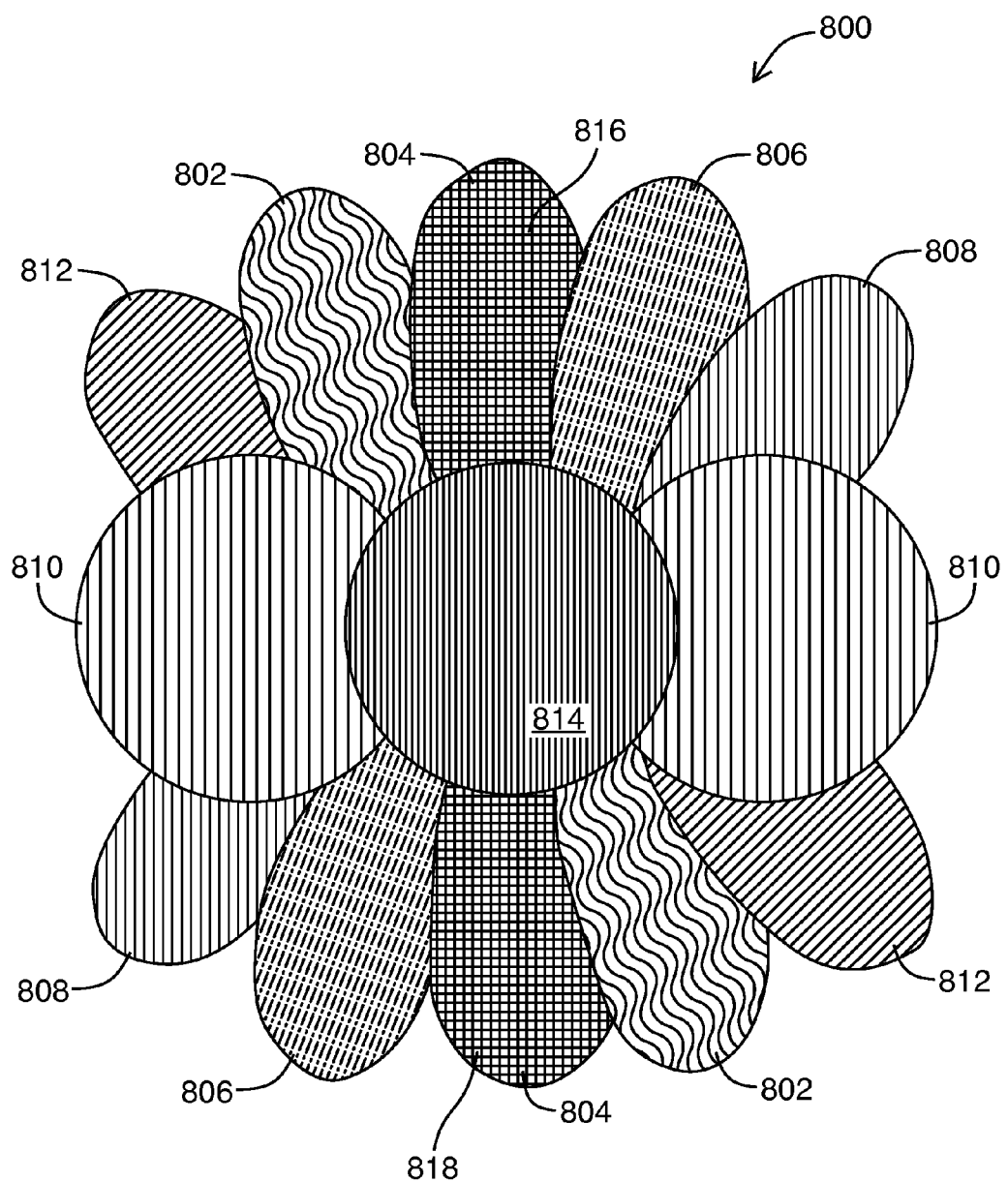
FIG. 8 is a schematic diagram illustrating a first exemplary zone pattern generated by the low earth orbit satellite of FIG. 5.
Figure 9:
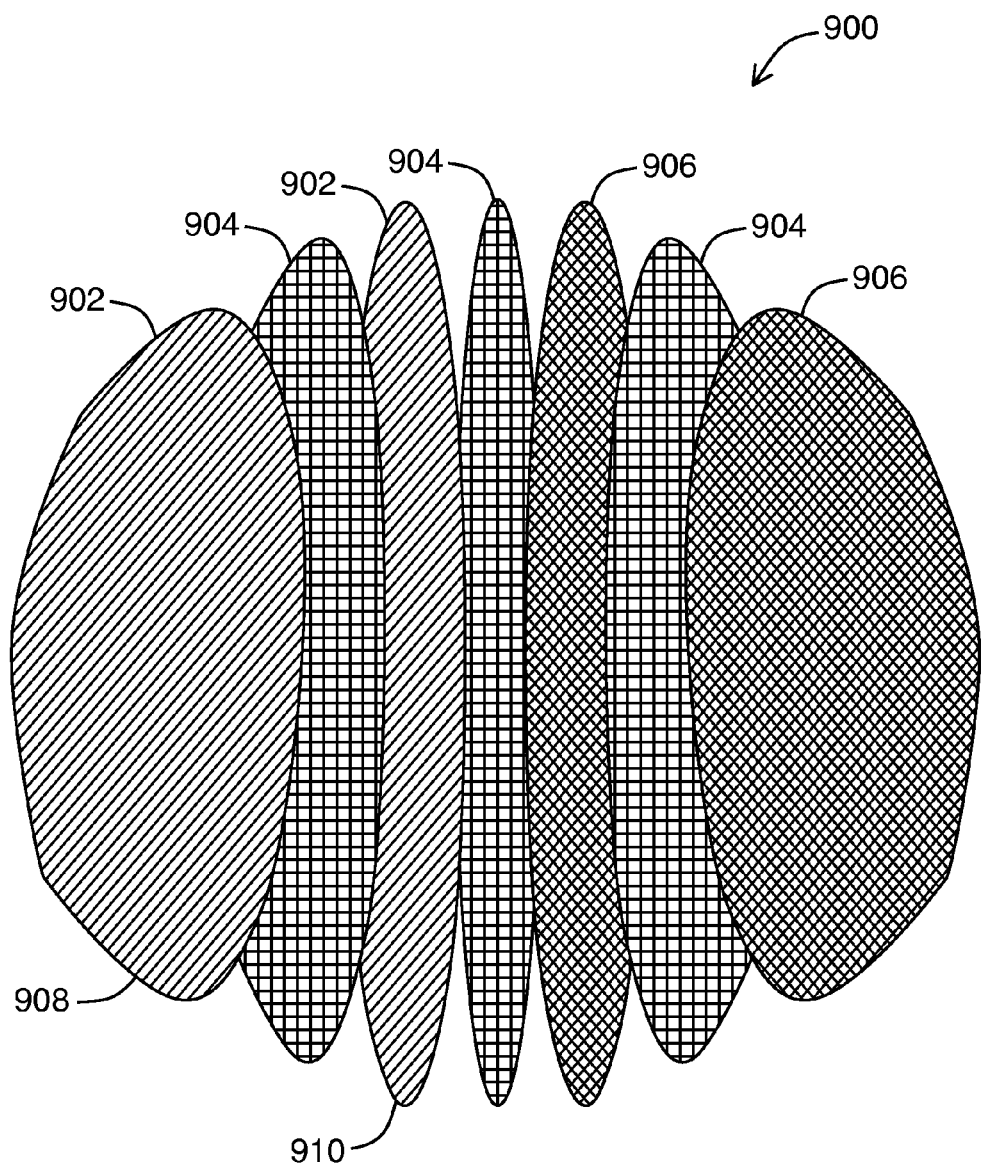
FIG. 9 is a schematic diagram illustrating a second exemplary zone pattern generated by the low earth orbit satellite of FIG. 5.

Reference is now made to FIGS. 8 and 9 which illustrate exemplary zone patterns 800 and 900. Zone pattern 800 is comprised of zones 802, 804, 806, 808, 810, 812, and 814, and zone pattern 900 is comprised of zones 902, 904 and 906. In these exemplary zone patterns 800 and 900, the FOV is segmented by area. Specifically, it can be seen that each zone (i.e. zones 802, 804, 806, 808, 810, 812, and 814) has an area that is less than the FOV area. It also can be seen, however, that each zone does not have to be of equal size. For example, zone 810 is larger than zone 814.

Furthermore, it can be seen that a zone can be a combination of a set of sub-zones. For example, zone 804 is comprised of two sub-zones 816 and 818, and zone 902 is comprised of two sub-zones 908 and 910. Accordingly, each zone does not have to be contiguous. Non-contiguous zones or zones with ambiguities may be formed, by example, by a thinned sensor array, where a thinned sensor array is defined as a sensor array in which the spacing between elements is greater than the wavelength of the microwave signal. Specifically, the wide spacing of the thinned array elements causes constructive and destructive interference producing nulls in the radiation pattern. This is contrasted to a classic phased array where the distance between array elements is limited to half a wavelength to minimize (i) the effect of side lobes and (ii) ambiguities.

The goal is to select the mathematical combinations so that the number of ships in each zone is less than the receiver detection threshold (i.e. 800-1000 ships). In this manner it can be said that the mathematical combinations are selected to increase the probability of recovering AIS messages.

In some embodiments, in addition to segmenting the FOV into a plurality of zones, one or more nulls (a low gain area) are introduced into the zone pattern to further improve the detection capability of the LEO satellite 12. Specifically, if a particular area has a high number of ships, the sensor signals can be mathematically combined to create a null in that area. If such a null is not inserted, the high number of ships may jeopardize detection of ships in an entire zone or FOV. It is not necessary to know the exact position of the null. Once a null is created, its position and/or other characteristics may be adaptively adjusted to improve the overall detection capability of the LEO satellite 12.

Since the LEO satellite 12 acts as a scanner as it moves over the earth, any nulls created in a zone pattern will also move. Accordingly, ships that fall within a particular null at a specific point in time will eventually be picked up by the LEO satellite 12 as the nulls are moved over the earth. Since a ship typically sends more AIS messages than are needed by the LEO satellite 12 to accurately detect and monitor the ship, it is not necessary for the LEO satellite 12 to receive every AIS message transmitted by the ship. For example, a ship typically sends one AIS message per 10 seconds whereas only one message per 10 minutes is required to accurately detect and monitor the location of a ship.

Figure 10:
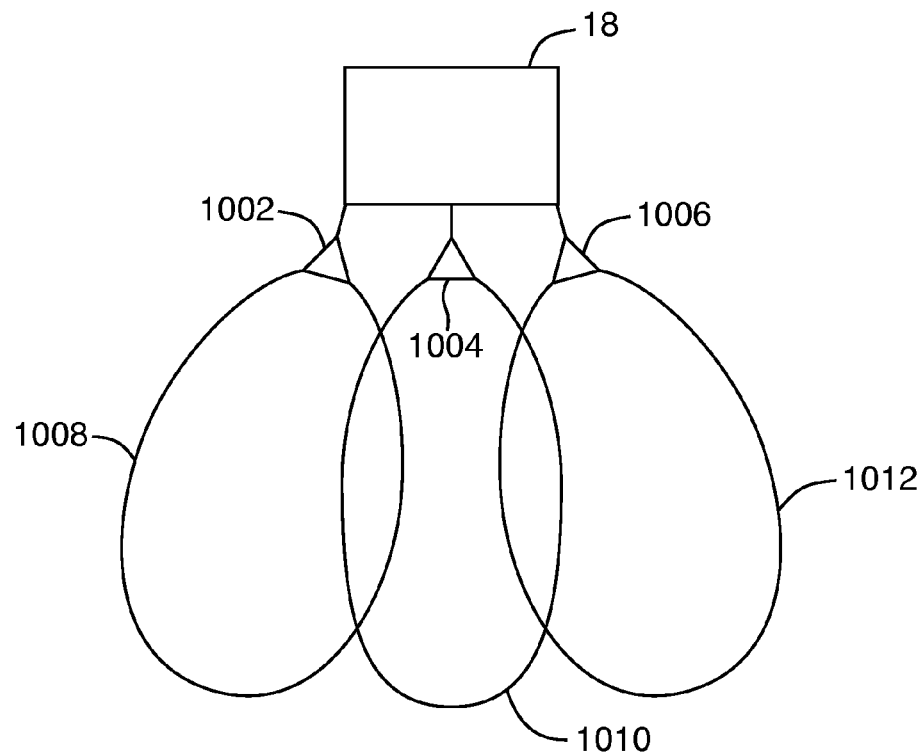
FIG. 10 is a schematic diagram illustrating a low earth orbit satellite with three sensors.
Figure 11:
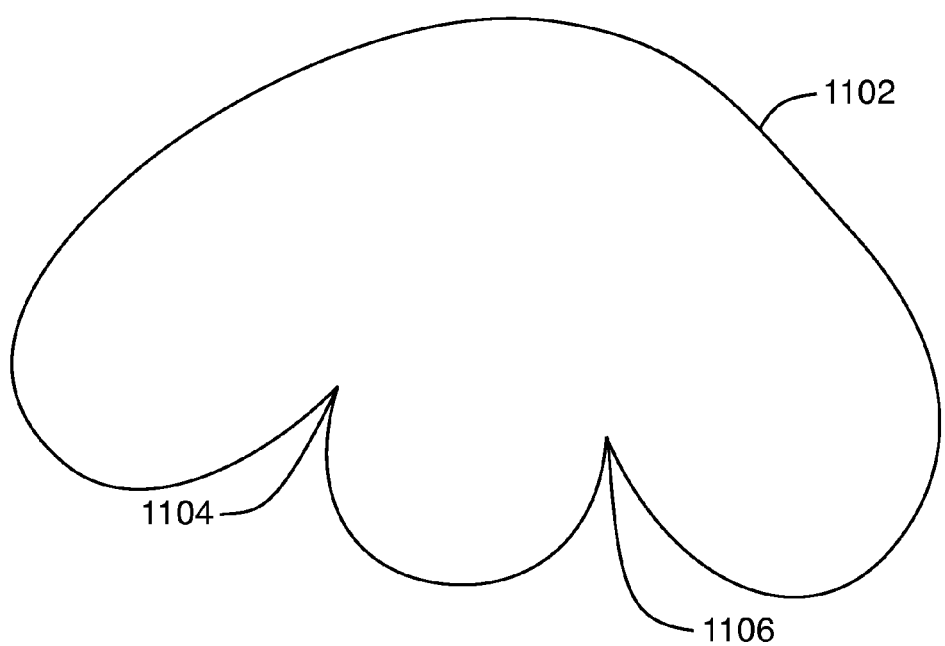
FIG. 11 is a schematic diagram illustrating a zone pattern generated from the sensors signals output by the three sensors of FIG. 10.

Reference is now made to FIGS. 10 and 11 which illustrate the nulling principle. Specifically, FIG. 10 illustrates a LEO satellite 12 with three sensors 1002, 1004, and 1006. Each sensor 1002, 1004 and 1006 has an associated radiation pattern 1008, 1010 and 1012. The sensor signals generated by the three sensors 1002, 1004 and 1006 are mathematically combined by a processing unit (i.e. processing unit 506) to generate a plurality of zone signals, each zone signal defining a zone.

FIG. 11 illustrates an exemplary zone 1102 with a plurality of nulls 1104 and 1106. In this example, the nulls 1104 and 1106 are generated by subtracting the second sensor signal (i.e. the sensor signal generated by the second sensor 1004) from the combination of the first and third sensor signals (i.e. the sensor signals generated by the first and second sensors 1002 and 1006). The strength of the nulls 1104 and 1106 may be adjusted by applying a gain to the second sensor signal before it is subtracted from the first and third sensor signals.

In the embodiment shown in FIG. 5, the processing of the sensor signals to produce the zone signals is performed at radio frequencies. However, in other embodiments the processing may be performed at intermediate frequencies or at baseband. In these other embodiments, the processing unit 506 may include a pre-processing unit to bring the sensor signals down to intermediate frequencies or baseband for processing. Processing may be performed by either analog or digital means.

In some embodiments, the mathematical combinations implemented by the processing unit 506 are stored in a memory unit (not shown) of the processing unit 506. In some cases the memory unit may have one set of mathematical combinations that are always implemented by the processing unit 506. In other cases, the memory unit may have sets of mathematical combinations that correspond to the trajectory of the LEO satellite 12 and the set of mathematical combinations used at a particular time is selected based on the position of the LEO satellite 12 in its orbit. The mathematical combinations may be selected through testing and simulation on the ground. In some cases the ground testing and simulation may be supplemented with testing or experimentation performed in orbit. An exemplary processing unit 506 will be described in reference to FIGS. 12 and 13.

In other embodiments, the LEO satellite 12 may include a controller 512 that selects the mathematical combinations and supplies them to the processing unit 506. In some cases the controller 512, like the memory unit of the processing unit 506, may have one static set of mathematical combinations that are always implemented by the processing unit 506. In other cases, the controller 512 may have sets of mathematical combinations that correspond to the trajectory of the LEO satellite 12 and the set of mathematical combinations used at a particular time is selected based on the position of the LEO satellite 12 in its orbit. In still other cases, the controller 512 may adaptively select the mathematical combinations to optimize the detection performance.

In the cases where the controller 512 adaptively selects the mathematical combinations, an initial set of mathematical combinations may be first selected. The initial set of mathematical combinations may be selected through ground testing and simulation, testing and experimentation performed in orbit, or both. Where, however, it is not possible to perform ground or orbit testing, an initial set of "safe" mathematical combinations may be selected to create a plurality of zones wherein each zone covers a smaller area than the FOV and together the zones cover the entire FOV.

Once the initial set of mathematical combinations have been selected, they may then be adaptively adjusted to optimize the detection performance of the satellite. In optimization of a system with multiple parameters, besides the optimal solution (i.e. the global minimum) often there exist multiple suboptimal solutions (i.e. local minimums). These local minimums are typically acceptable for the systems and methods described herein. Which suboptimal solution (i.e. local minimum) is reached during the adaptive process generally depends on the initial set of mathematical combinations. Accordingly, to ensure that the adaptive process does not get stuck using a particular suboptimal solution (i.e. local minimum), it may be advantageous to apply a sufficiently strong perturbation in the adaptive process to force the optimization trajectory to jump out of the converging region associated with a particular local minimum. Depending on definition of the optimization cost function, the optimization problem may also equivalently be interpreted as that of finding local or global maximums instead of minimums.

In some embodiments, the controller 512 adaptively selects the mathematical combinations based on the characteristics of the zone signals produced by the processing unit 506. For example, the controller 512 may select the mathematical combinations based on one or more of the following: (1) the number of messages extracted from the zone signals; (2) the total power of the zone signals; (3) the bandwidth variations of the zone signals; (4) the amplitude distribution of the zone signals; (5) time slot boundaries; (6) the phase distribution of the zone signals; (7) the error rate (i.e. bit error rate) of the zone signals; (8) an eye diagram of the zone signals; (9) the phase trajectory of the zone signals; (10) cross-correlation or cross covariance between zone signals; and (11) coherency analysis of the zone signals. A person of skill in the art will understand that these are simply examples of suitable zone signal characteristics and other zone signal characteristics may also be used.

The total power of the zone signals may indicate the density of ships in each zone, the potential collision probability, and the interference level. The bandwidth variations of the zone signals may be useful to distinguish interference from the AIS signals, or to perform zoning according to Doppler offsets.

The amplitude (or power) distribution in each zone signal may indicate the density of ships in each zone and the collision level in each zone. Specifically, amplitude (or power) distribution analysis is the examination of the signal level variations in the time domain. Typically a "bad" zone signal (a zone signal comprising multiple interfering/colliding AIS GMSK signals/messages) will exhibit a lower peak to average amplitude or power ratio than a "good" zone signal (a zone signal comprising only a single AIS GMSK signal/message per message time slot).

Time slot boundaries occur in AIS signals (and thus zone signals) due to the SOTDMA time slot structure described above. In a "good" zone signal, the consistency of the average signal power in each slot is expected to vary from slot-to-slot in a different manner. Typically "good" zone signals will have a higher ratio of maximum to minimum slot power than "bad" zone signals. Similarly, the regions of overlap between adjacent slot signals is expected to be different for "good" and "bad" zone signals. The time slot boundary analysis may be performed on the zone signal as it is received, or block wise in segments which represent the time period of a single AIS message. Where the analysis is done on a segment basis, the segmenting may be started at an assumed or analyzed estimated slot boundary location. The result of the analysis can be based on a single time slot or a number of time slots.

The phase distribution of a zone signal may indicate the quality of the zone signal. In some embodiments, the phase distribution of a particular zone signal may be assessed using a histogram of phase values. Specifically, a "good" zone signal comprising a single valid AIS message may cluster (show a higher histogram frequency) around a number of distinct phase values. Conversely, a "bad" zone signal comprising a plurality of collided messages may not show such clustering and typically distributed over a wider range. This analysis can be performed on the complete zone signal, or smaller time segments (or slots).

An eye diagram of a zone signal may also be useful in detecting collisions in a particular zone. Specifically, an eye diagram, following an assumed symbol timing recovery may be analyzed to determine the quality of the eye opening (a figure of merit of the signal to noise ratio (SNR) and the signal to interference ratio (SIR)). A closed or non-distinct eye may indicate undecodable and/or collided AIS signals. Collided AIS signals are defined as two or more AIS signals in the same time slot at similar power levels making error free detection of even the stronger AIS signal challenging or impossible.

The phase trajectory of a zone signal is the unwrapped phase angle of the zone signal or the sample by sample variations in the unwrapped phase angle. A "good" zone signal comprised of a single well-defined AIS signal is expected to have a phase trajectory with a number of well-defined transitions equal to the GMSK phase modulation. Conversely, a "poor" zone signal comprised of multiple interfering AIS signals will typically produce a phase trajectory that is more random, and includes many, less distinct phase transitions caused by the interference. This analysis can be performed on the complete zone signal, or smaller time segments (or slots).

The mathematical combinations may also be selected based on the statistical independence of the zone signals. As described above, the statistical independence of a particular zone signal may be measured by performing a cross-correlation or a cross covariance of the zone signal and each of the other zone signals. The cross-correlations or cross covariances may be performed in sequence or simultaneously. Generally a zone signal having a lower cross-correlation with other zone signals has a high statistical independence from the other zone signals. This analysis can be performed on the complete zone signal, or smaller time segments (or slots).

Coherency analysis, such as via an autocorrelation, may yield similar results to the phase trajectory analysis described above. Specifically, a "good" zone signal comprised of only a single AIS signal/message is expected to have a certain shape (1% to 10% to 50% to 90% amplitude probability distribution), peak, standard deviation, etc. Conversely, a "bad" zone signal comprised of a plurality of interfering AIS signals/messages will have statistics of the autocorrelation function that differ from those of the single AIS signal/message. This analysis can be performed on the complete zone signal, or smaller time segments (or slots).

Based on the characteristics of the zone signals the controller 512 may adjust or fine-tune the mathematical combinations. The controller 512 may, for example, increase the size of certain zones and decrease the size of other zones, or adjust the amplification of certain zone signals until the characteristics improve. The controller 512 may also adjust the polarization, ambiguity patterns, or the zone distribution relative to the direction the satellite is moving.

The receiver 508 receives the plurality of zone signals from the processing unit 506 and extracts the messages contained therein. The receiver 508 may be a standard AIS receiver, such as the EURONAV™ AI3000 or the Smart Radio Holdings Limited™ SR162 Professional AIS Receiver, or a proprietary receiver, such as that described in U.S. Published Patent Application No. 2008/0304597 to Peach, incorporated herein by reference. In some embodiments, such as that shown in FIG. 5, the LEO satellite 12 includes a single receiver 508 that sequentially processes the zone signals. In these embodiments the LEO satellite 12 may include a sampler (not shown) for sampling each of the zone signals and a memory module (not shown) for storing the samples. In other embodiments, the LEO satellite 12 includes multiple receivers (i.e. receiver 508) and each zone signal is provided to a separate receiver for parallel or concurrent processing of the zone signals.

In some embodiments, the LEO satellite 12 may also include a screening unit 514 that receives the plurality of messages extracted by the receiver 508 and reduces the message count. Typically this is done to reduce the amount of bandwidth required to transmit the extracted messages from the LEO satellite 12 to the ground station 14. In some embodiments, this involves eliminating any duplicate messages. Due to the fact that each zone signal is a combination of the same sensor signals, many messages will be detected multiple times.

The screening unit 514 sorts the messages in time order so that any duplicates can be easily identified. AIS messages typically include a time stamp that provides information on when the signal was generated. This time stamp, however, is not typically sufficient to accurately sort the messages. Accordingly, the time sorting performed by the screening unit 514 is typically based on the reception time of the signal as determined by the receiver 508.

The receiver 508 will typically have a time reference (i.e. clock) that may or may not be derived from GPS (Global Positioning System) or other source of accurate timing information. Each message extracted by the receiver 508 will be tagged with a time stamp that indicates the time at which it was decoded. This will then facilitate sorting of the messages by the screening unit 514. Where there are multiple receivers that operate in parallel, the time reference (i.e. clock) of each of the receivers will typically be synchronized. Where there is only a single receiver that processes multiple zone signals serially, the time stamp may be a measure of the delta from the start of the zone signal, and the time reference (i.e. clock) may be reset each time a new zone signal is processed.

Once the messages have been sorted in time order the screening unit 514 identifies duplicate messages by comparison of message content, and modifies the message list so there are no duplicates. In some embodiments, the screening unit 514 modifies the message list as follows: (1) if two or more of the duplicate messages are identical (e.g. neither has a bit error) then one or more of the duplicate messages are deleted; (2) if one of the duplicate messages has no bit error, and one or more of the duplicate messages has a bit error, the duplicate message with the bit error is deleted; and (3) if all of the duplicate messages have a bit error, the duplicate messages may be combined to form a single message with a better bit error rate.

In other embodiments, the screening unit 514 modifies the message list based on historical data related to the ships from which the duplicate messages were sent. In some cases, the screening unit 514 may select a particular duplicate message to retain based on which of the duplicate messages is consistent with the historical data related to the ship. In this manner, the screening unit 514 is attempting to identify and remove any outliers. For example, ships typically travel along a specific advertised path, or shipping lane. The screening unit 514 may select a particular message to retain based on which message is consistent with the path advertised by the corresponding ship. In other cases, the screening unit 514 may combine the duplicate messages to generate a message that is consistent with the historical voyage trend data associated with the corresponding ship.

In some embodiments, the screening unit 514, in addition to removing duplicate messages from the message list, may also reduce the number of messages by removing non-duplicate messages which do not improve the ability to detect and monitor the location of ships from space. Specifically, as described above, the rate at which ships transmit AIS messages is related to the rate at which they are moving. Typically the faster a ship is moving, the more messages it generates per second. This scheme was developed for collision avoidance purposes. However, when a ship is moving at high speeds, the rate at which ships transmit AIS messages may exceed the rate required to monitor a ship's movement from space. Accordingly, the screening unit 514 may eliminate a number of non-duplicate messages from the same ship to reduce the number of messages from that ship down to a number required for space-monitoring purposes.

The screening unit 514 may be implemented in software on, for example, a general-purpose computer or a dedicated processor.

The transmitter unit 510 receives the messages from either the receiver 508 or the screening unit 514 (depending on whether the LEO satellite 12 includes a screening unit 514) and transmits or downlinks them to the ground station 14. The transmitter unit 510 typically includes a modulator (not shown) and a transmitter antenna (not shown). The modulator modulates the messages onto a carrier signal for transmission to the ground station 14. The modulator may employ various modulation techniques, such as phase-shift keying (PSK) which modulates the message data onto the carrier in such a way that the sequence of zeros and ones making up the messages is represented by phase shifts in the carrier signal. Examples of suitable PSK techniques include binary PSK, quadrature PSK, or a higher-order PSK such as 8-PSK. Quadrature PSK uses four possible phase values and can therefore transmit two bits of data per symbol on the carrier. 8-PSK uses eight phase values and thus can transmit three bits of data per symbol on the carrier.

The modulator may be implemented by either digital or analog circuits. In digital implementation, the modulations are typically performed in the digital domain with a constellation mapper. The output of the constellation mapper may then be passed through a digital pulse shaping filter followed by a digital to analog converter to convert the digital modulated signal to an analog modulated signal for further processing.

To reduce the transmission errors between the LEO satellite 12 and the ground station 14, the modulator may be configured to implement forward error correction (FEC), using, for example, Reed-Solomon codes, convolutional codes, Turbo codes, or Low Density Parity Check codes. As is known to those of skill in the art, forward error correction is where redundant data, also known as an error-correction code, is added to a message prior to transmission. This allows the receiver to detect and correct errors without the need to ask the sender for retransmissions or for additional data.

The modulated signal(s) are then sent to the transmitter which up-converts them to the frequency range required for transmission, and amplifies these signals so that they have the required signal strength needed for transmission to the ground station 14. The transmitter may also include an output filter to limit the out of band signals generated by the amplification to control the potential interference with users in nearby frequency bands.

Since the decoded or extracted messages may include classified information that must be kept secure, encryption can also be employed by the transmitter unit 510 prior to preparing the messages for transmission to a ground station. In these cases, the transmitter unit 510 may also include an encryption module (not shown) for encrypting the plurality of messages received from the receiver 508 or the screening unit 514.

Figure 12:
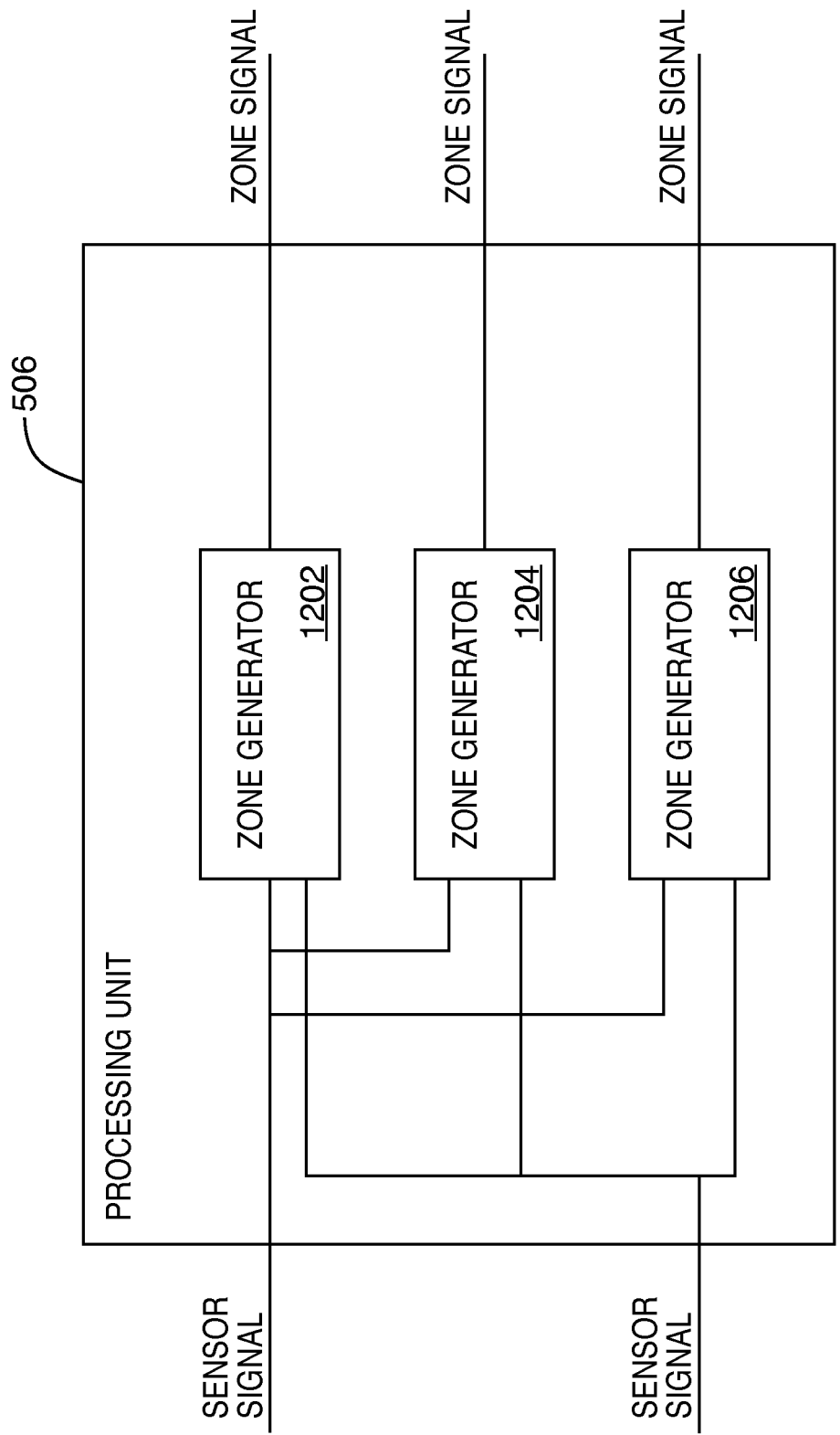
FIG. 12 is a block diagram of the processing unit of FIG. 5 including a zone generator in accordance with an embodiment.

Reference is now made to FIG. 12, which is a block diagram of a processing unit 506 in accordance with an embodiment. The processing unit 506 comprises three zone generators 1202, 1204 and 1206. Each zone generator 1202, 1204 and 1206 receives the sensor signals output by the sensors 502 and 504 and mathematically combines them to produce a zone signal. As described above, although each zone generator 1202, 1204 and 1206 receives each of the sensor signals, each zone generator 1202, 1204 and 1206 may not mathematically combine all of the sensor signals. For example, if there are three sensor signals, some zone generators may only mathematically combine two of the three sensor signals, and some zone generators may mathematically combine all three sensor signals. Although the processing unit 506 illustrated in FIG. 12 includes three zone generators 1202, 1204 and 1206 it will be evident to a person of skill in the art that the processing unit may have other numbers of zone generators. Typically, a processing unit will have at least two zone generators to segment the FOV into at least two zones. An exemplary zone generator 1202 will be described in reference to FIG. 13.

Figure 13:
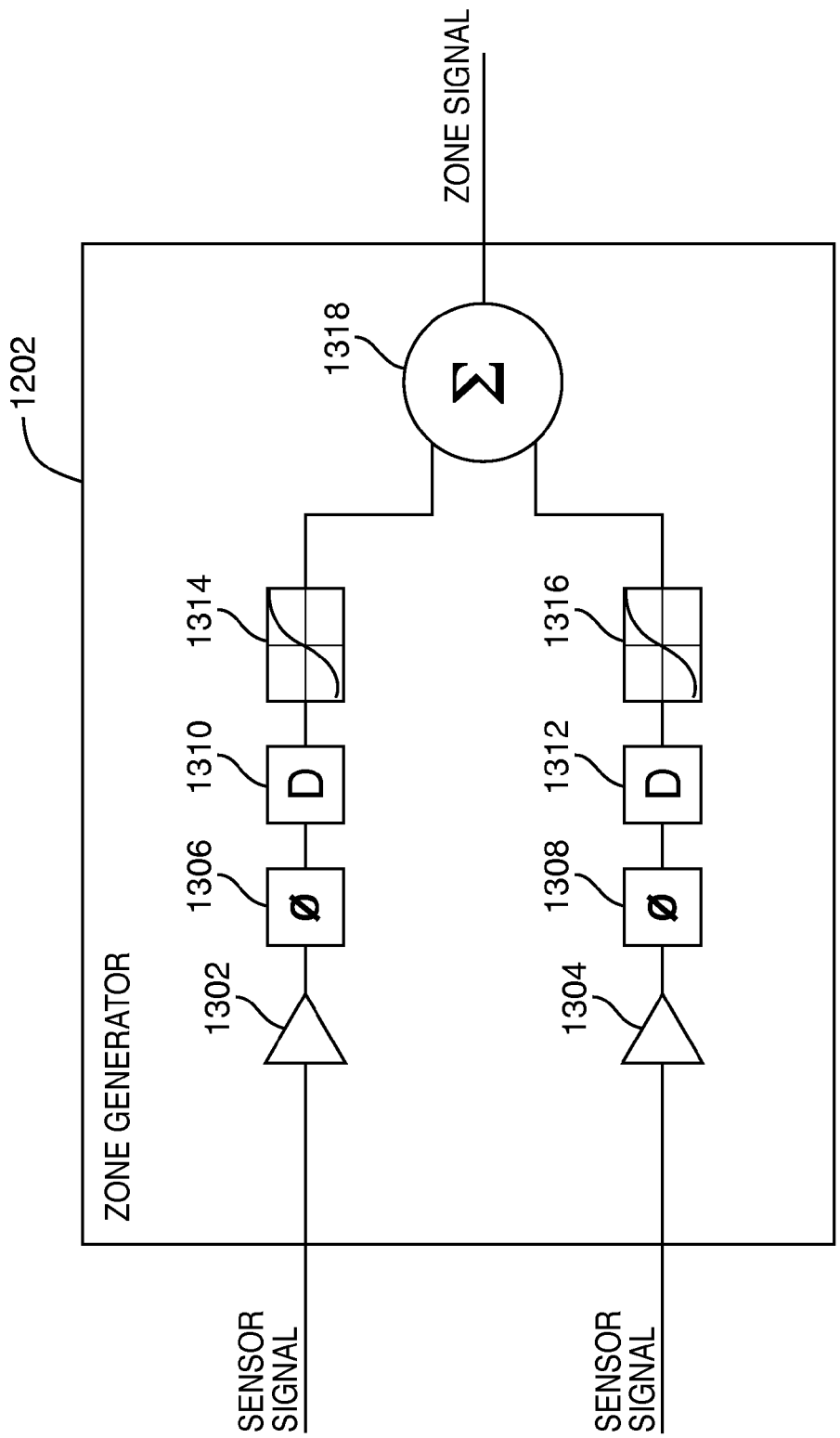
FIG. 13 is a block diagram of the zone generator of FIG. 12 in accordance with an embodiment.

Reference is now made to FIG. 13, which is a block diagram of a zone generator 1202 in accordance with an embodiment. As described above, the zone generator 1202 receives a copy of each of the sensor signals generated by the sensors 502 and 504 and mathematically combines them to produce a zone signal.

The zone generator 1202 comprises a signal path for each of the sensor signals. In the embodiment shown in FIG. 13, the zone generator 1202 receives two sensor signals, thus there are two signal paths. Each signal path modifies or adjusts one of the sensor signals. In some embodiments, each signal path may include one or more of the following adjustment blocks: (a) an amplifier or gain adjuster 1302 or 1304;

(b) a phase shifter 1306 or 1308; (c) a delay block 1310 or 1312; and (d) a transfer function block 1314 or 1316. The order of the adjustment blocks within a particular signal path is not typically important. However, since the transfer function blocks 1314 and 1316 may introduce a non-linearity, it may be beneficial to place transfer blocks later in the signal path.

Each amplifier or gain adjuster 1302 and 1304 applies amplitude or gain scaling to one of the sensor signals. For example, the first amplifier 1302 may apply a gain of $k_1$ to the first sensor signal, and the second amplifier 1304 may apply a gain of $k_2$ to the second sensor signal.

Each phase shifter 1306 and 1308 applies a phase shift between 0° and 360° to one of the sensor signals. For example, the first phase shifter 1306 may apply a phase shift of $\Phi_1$ to the first sensor signal, and the second phase shifter 1308 may apply a phase shift of $\Phi_2$ to the second sensor signal. As is known to a person of skill in the art, a phase shift of 180° will invert the sensor signal.

Each delay block 1310 and 1312 applies a delay to one of the sensor signals. For example, the first delay block 1310 may apply a delay $D_1$ to the first sensor signal, and the second delay block 1312 may apply a delay $D_2$ to the second sensor signal. The delays implemented by the delay blocks 1310 and 1312 are typically in the microsecond (µs) range, but may be smaller or larger.

Each transfer function block 1314 and 1316 applies a transfer function to the one of the sensor signals. For example, the first transfer function block 1314 may apply a first transfer function $Fn_1$ to the first sensor signal, and the second transfer function block 1316 may apply a second transfer function $Fn_2$ to the second sensor signal. Typically each transfer function adjusts the amplitude of one of the sensor signals as a function of the input amplitude. The most trivial (yet completely valid) transfer function is purely linear, in which the input and output are identical. In some embodiments, the transfer functions (i.e. $Fn_1$ and $Fn_2$) implemented by the transfer function blocks 1314 and 1316 are non-linear, such as the transfer functions shown in FIGS. 6 and 7.

In other embodiments, one or more signal paths may include a filter transfer function block wherein the output of the filter transfer function block is a function of the input signal frequency. Such a frequency transfer function block provides for frequency selective filtering or equalization of the sensor signal.

The adjustment block coefficients ($k_1$, $k_2$, $\Phi_1$, $\Phi_2$, $D_1$, $D_2$, $Fn_1$ and $Fn_2$) define a "mathematical combination" as that term is used herein. As described above in reference to FIG. 5, the mathematical combinations (i.e. the adjustment block coefficients) may be static, or they may be dynamically selected by the controller 512. In some embodiments, the controller 512 selects the mathematical combinations (i.e. the adjustment block coefficients) based on the position of the satellite 12 in its orbit. In other embodiments, the controller 512 adaptively selects the mathematical combinations (i.e. the adjustment block coefficients) based on characteristics of the zone signals.

Once each of the sensor signals has been adjusted by the adjustment blocks in the corresponding signal path, the modified zone signals are combined using a combiner or summer 1318 to produce a zone signal.

Figure 14:
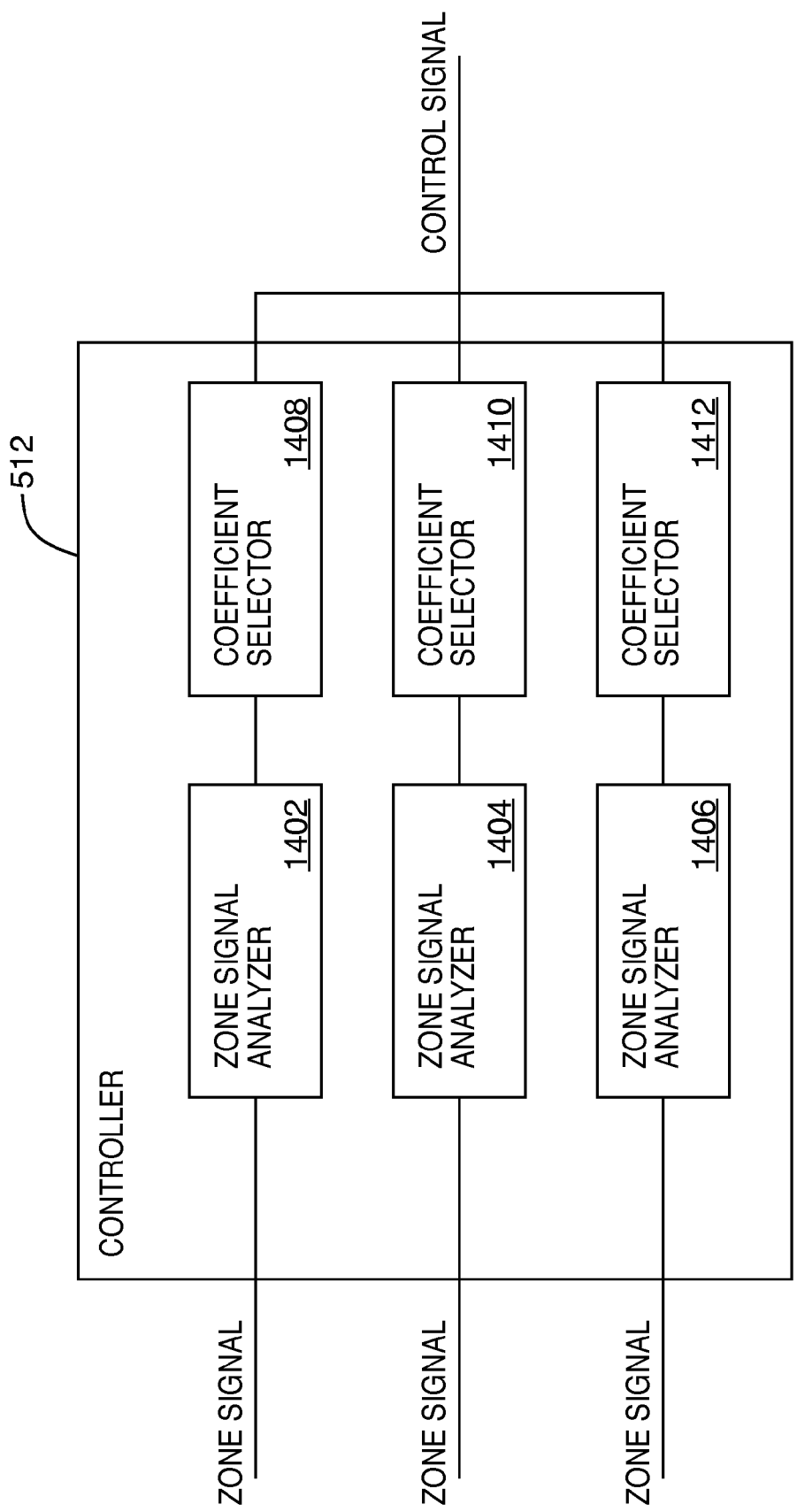
FIG. 14 is a block diagram of the controller of FIG. 5 in accordance with a first embodiment.

Reference is now made to FIG. 14, which is a block diagram of a controller 512 in accordance with a first embodiment. The controller 512 receives the plurality of zone signals produced by the processing unit 506, analyzes the received zone signals, selects or modifies the coefficients corresponding to the zone signals, and outputs a control signal that relays the selected coefficients to the processing unit 506. The processing unit 506 then modifies the adjustment block coefficients based on the received control signal.

The controller 512 comprises a plurality of zone signal analyzers 1402, 1404 and 1406 and a plurality of coefficient selectors 1408, 1410 and 1412. Typically there is one zone signal analyzer 1402, 1404 or 1406 and one coefficient selector 1408, 1410 or 1410 for each zone signal received. For example, in the embodiment shown in FIG. 14, the controller 512 receives three zone signals, thus there are three zone signal analyzers 1402, 1404 and 1406, and three coefficient selectors 1408, 1410 and 1412.

Each zone signal analyzer 1402, 1404 and 1406 receives one of the zone signals, analyzes the received signal, and outputs a metric indicative of the analysis. Specifically, the first zone signal analyzer 1402 analyzes the first zone signal, the second zone signal analyzer 1404 analyzes the second zone signal, and the third zone signal analyzer 1406 analyzes the third zone signal. The analysis performed by each zone signal analyzer 1402, 1404 and 1406 may include analyzing one of the zone signal characteristics described above in relation to FIG. 5. For example, each zone signal analyzer 1402, 1404 and 1406 may analyze, for example, the total power of the zone signal, the bandwidth variations of the zone signal, the amplitude distribution of the zone signal or the phase trajectory of the zone signal.

Each coefficient selector 1408, 1410 and 1412 receives the metric indicative of the analysis performed by one of the zone signal analyzers 1402, 1404 and 1406, and selects and outputs new adjustment block coefficients based on the received metric. Specifically, the first coefficient selector 1408 receives the output metric from the first zone signal analyzer 1402 and selects new adjustment block coefficients for generating the first zone signal; the second coefficient selector 1410 receives the output metric from the second zone signal analyzer 1404 and selects new adjustment block coefficients for generating the second zone signal; and the third coefficient selector 1412 receives the output from the third zone signal analyzer 1406 and selects new adjustment block coefficients for generating the third zone signal. The specific adjustment block coefficients selected/adjusted by the coefficient selectors 1408, 1410 and 1412 will be based on the particular coefficients implemented by the corresponding processing unit 506.

The operation of the zone signal analyzers 1402, 1404 and 1406 and the coefficient selectors 1408, 1410 and 1412 will be further described using an example configuration. In the example configuration, there are three sensor signals, and the three sensor signals are each amplitude adjusted and then combined by a zone generator (e.g. zone generator 1202) to form a first zone signal. Specifically, a first gain $k_1$ is applied to the first sensor signal, a second gain $k_2$ is applied to the second sensor signal, and a third gain $k_3$ is applied to the third sensor signal.

When a zone signal analyzer 1402, 1404 or 1406 receives the zone signal it analyzes the received zone signal and outputs a metric representative of the analysis. As described above, the analysis may involve analyzing a particular characteristic of the zone signal, such as the phase trajectory of the zone signal.

When a coefficient selector 1408, 1410 or 1412 receives the metric it may select the coefficients $k_1$, $k_2$ and $k_3$ according to a simple linear optimization described using Table 1. First, a number of start and trial values are applied (these could be predefined based on knowledge of the sensors (e.g. sensors 502 and 504), past values known to be effective, or a simple set of values). The trial value with the highest metric is then used as a starting point for optimization. In this example, Trial 1 (when $k_3$ is −1) has the highest metric.

TABLE 1

|  | $k_1$ | $k_2$ | $k_3$ | Metric |
|---|---|---|---|---|
| Start |  | 1 | 1 | 1 | 0.1 |
| Trial 1 | 1 | 1 | −1 | 0.8 |
| Trial 2 | 1 | −1 | 1 | 0.7 |
| Trial 3 | −1 | 1 | 1 | 0.3 |
| Optimization 1.1 | 1 | 1 | −0.9 | 0.75 |
| Optimization 1.2 | 1 | 1 | −1.1 | 0.82 |
| Optimization 1.3 | 1 | 1 | −1.2 | 0.95 |
| Optimization 1.4 | 1 | 1 | −1.3 | 0.92 |
| Optimization 1.5 | 1 | 1 | −1.2 | 0.95 |

The first optimization step is to set $k_3$ to values above −1 and then below −1, and depending on the change in the metric, proceed in the same direction until it is found that the metric does not improve. In the example shown in Table 1, the values selected were −0.9 then, −1.1, −1.2, −1.3 and then back to −1.2 when demonstrated to be the value with the best metric.

Next, optimization could proceed to selecting $k_2$, and/or another of the other coefficients. Note that $k_1$ does not need to be optimized if $k_2$ and $k_3$ are optimized. Specifically, varying $k_2$ and $k_3$ cover all potential amplitude (or equivalently power) ratios of $k_1$, $k_2$ and $k_3$.

Following such an optimization in the amplitude scaling factor k, a similar optimization may be applied to one or more of the other coefficient sets (phase, delay, transfer function) using the initially optimized gain factor coefficients ($k_1$, $k_2$, $k_3$) as a starting point.

In some embodiments, the process may be repeated after each of the coefficients has been optimized since it is generally true that the coefficients interact. For example, optimization for coefficient $k_3$ may be affected by optimization for coefficient $k_2$, or the phase, delay or transfer function optimizations.

In other embodiments, the optimization process may be repeated using smaller step sized to further optimize the results. When changes to the metric become acceptably small, a decision can be made to stop optimization. In other embodiments, instead of making small step changes, the size of changes in the metric can be used to scale the step changes, improving the rate of convergence of the optimization.

Although the example was described using a simple linear optimization process, it will be evident to a person of skill in the art that any number of standard optimization methodologies may be employed to select the coefficients.

Figure 15:
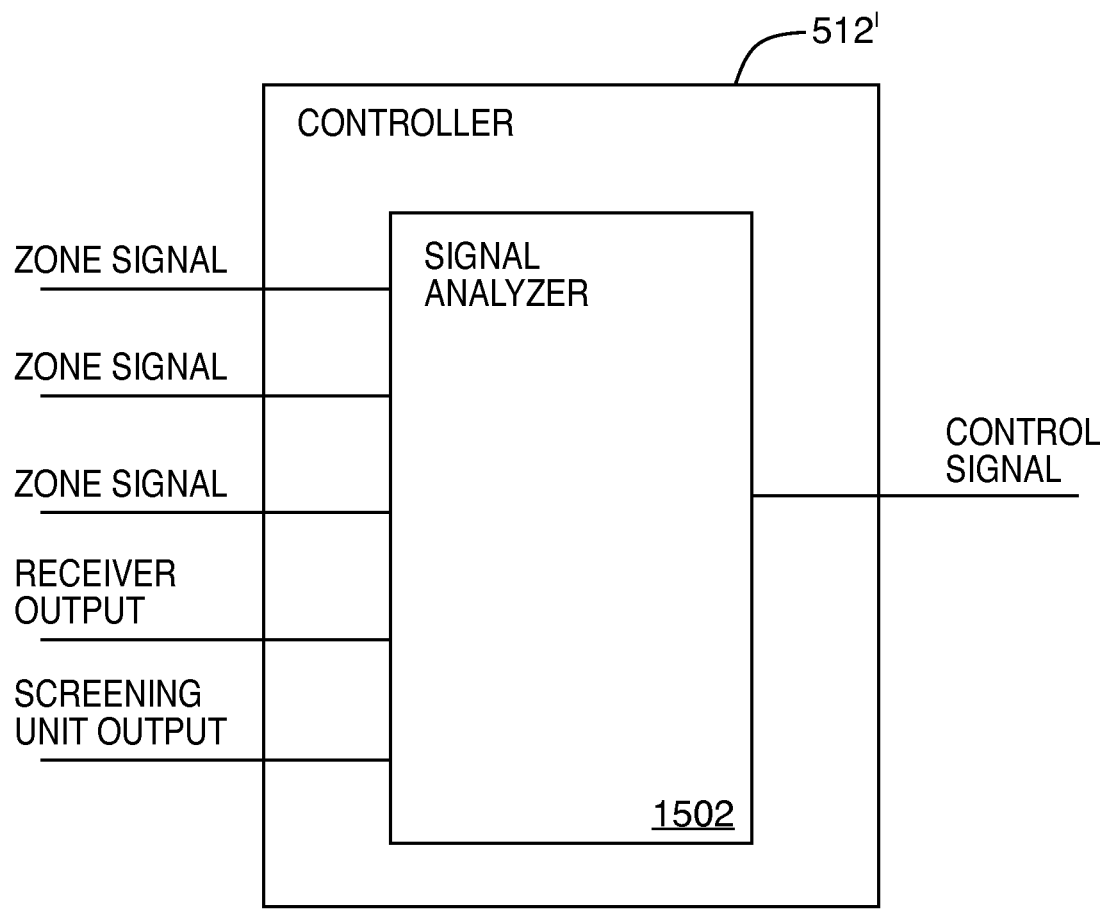
FIG. 15 is a block diagram of the controller of FIG. 5 in accordance with a second embodiment.

Reference is now made to FIG. 15, which is a block diagram of a controller 512' in accordance with a second embodiment. The controller 512' of FIG. 15 differs from the controller 512 of FIG. 14 in that instead of analyzing each zone signal independently and then selecting the coefficients for a particular zone signal based on the analysis of that zone signal, an analysis of the zone signals is done collectively and the coefficients for all of the zone signals are selected based on the collective analysis.

Specifically, the controller 512' of FIG. 15 comprises a signal analyzer 1502 which receives all of the zone signals, performs an analysis on one or more of the zone signals, selects coefficients for the zone signals based on the analysis, and outputs the coefficients as a control signal. Since the signal analyzer 1502 receives all of the zone signals, the signal analyzer may perform a comparison of zone signals. For example, the signal analyzer 1502 may perform a cross-correlation or a cross covariance of the zone signals to determine their statistical independence. In another example, the analysis may involve determining the ratio of the average signal strength of a zone signal (e.g. the mean square amplitude or power, computed as the mean power calculated from the mean square voltage in each slot) over many message slots e.g. 50) divided by the average mean squared power in the corresponding slots of all other zone signals, or other analyses that indicate that overall detection performance of the satellite has improved though selection of the coefficients to form zone signals. One such metric could be the maximization of the total number of uniquely received AIS messages from all individual zone receivers.

Where the analysis involves ratios or information from multiple zone signals, it may still be beneficial to perform some optimization on each zone signal independently first, before refining the optimization over multiple zone signals.

As shown in FIG. 15, the signal analyzer 1502 may also receive the output of the receiver 508, or the screening unit 514, or both and use this information to select the coefficients for the zone signals.

Figure 16:
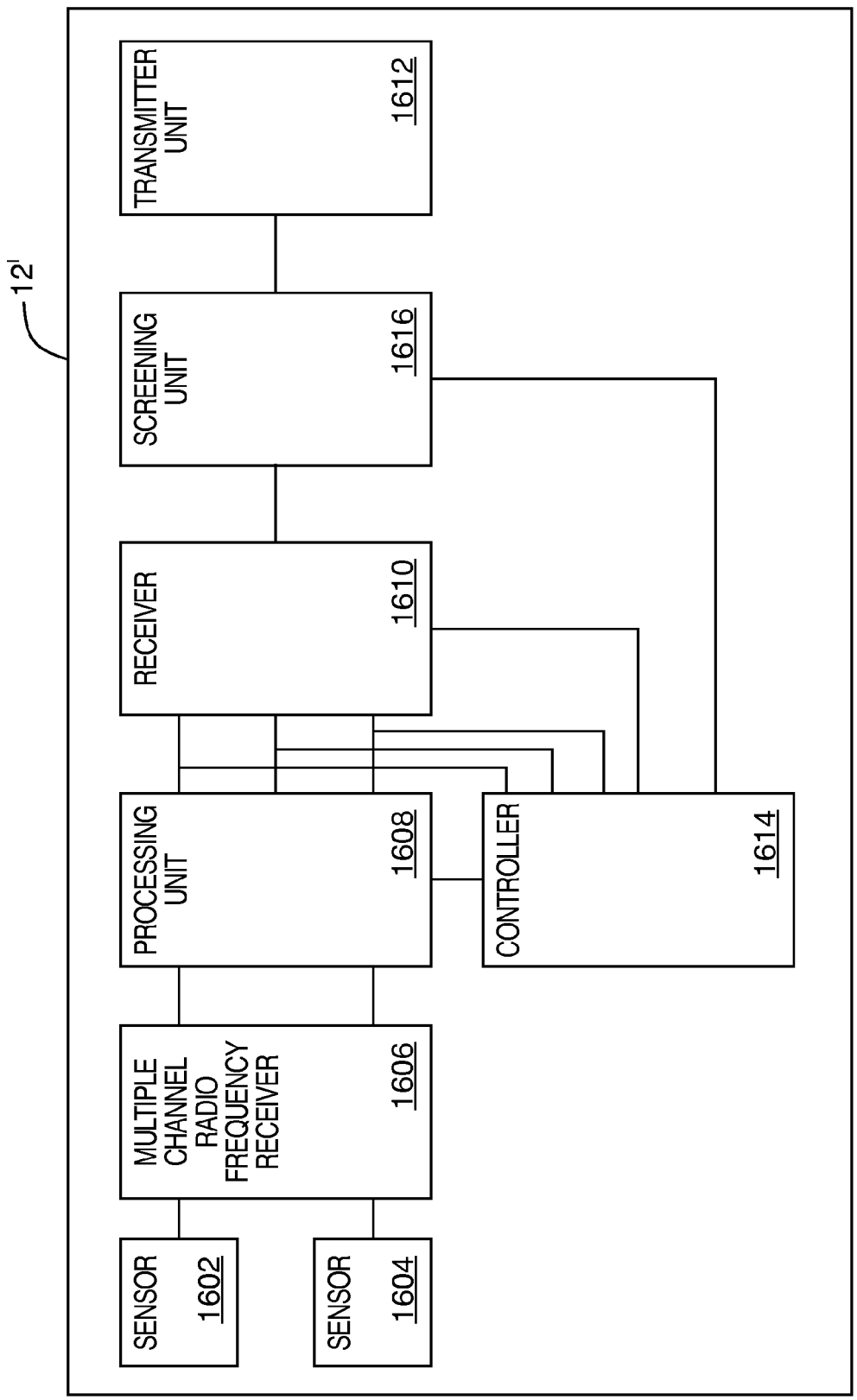
FIG. 16 is a block diagram of the low earth orbit satellite of FIG. 1 in accordance with a second embodiment.

Reference is now made to FIG. 16 which is a block diagram of a LEO satellite 12' in accordance with a second embodiment. The LEO satellite 12', like the LEO satellite 12 of FIG. 5, has a plurality of sensors that each receives AIS signals transmitted by a plurality of ships 16 and output a sensor signal. The sensor signals are mathematically combined to produce a plurality of zone signals. The zone signals segment the satellite's FOV into a plurality of zones. The zone signals are then separately processed to extract the AIS messages contained therein. In the embodiment shown in FIG. 16, The LEO satellite 12' includes two sensors 1602 and 1604, a multiple channel radio frequency receiver 1606, a digital processing unit 1608, a receiver 1610 and a transmitter unit 1612. Similar to the LEO satellite 12 of FIG. 5, the LEO satellite 12' may also include a controller 1614, and a screening unit 1616.

The sensors 1602 and 1604 of FIG. 16 correspond to the sensors 502 and 504 of FIG. 5. Specifically, each sensor 1602 and 1604 receives a plurality of AIS signals from the ships 16 and generates a sensor signal that is representative of the received AIS signals. The description of the sensors 502 and 504 given above with respect to FIG. 5 applies equally to the sensors 1602 and 1604. For example, the sensors 1602 and 1604 may be Very High Frequency (VHF) antennas configured to receive AIS signals. The antennas may be physically separated; they may be of different polarizations; and may be of different types.

The multiple channel radio frequency receiver 1606 receives the analog sensor signals from the sensors 1602 and 1604 and converts them into digital sensor signals. This allows the processing unit 1608 to perform the zoning operation in the digital domain. As discussed below, this improves the flexibility and control of the zoning operation. The analog to digital conversion performed by the multiple channel radio frequency receiver 1606 may include, for example, amplification, filtering, down conversion, sampling, frequency recovery, and/or phase offset recovery of the sensor signals.

The processing unit 1608 performs the same function as the processing unit 506 of FIG. 5. Specifically, the processing unit 1608 of FIG. 16 receives the plurality of digital sensor signals from the multiple channel radio frequency receiver 1606 and mathematically combines them to produce a plurality of zone signals. Each zone signal represents a portion of the FOV of the LEO satellite 12'. Accordingly, the zone signals segment the FOV of the LEO satellite 12' into a plurality of smaller zones. In some embodiments, each zone signal represents a zone and the area of the zone is less than the area of the FOV.

The description of the functions performed by the processing unit 506 given above with respect to FIG. 5 applies equally to the processing unit 1608 of FIG. 16. However, since the processing unit 1608 receives digital sensor signals from the multiple channel radio frequency receiver 1606, and the processing unit 506 of FIG. 5 receives analog sensor signals directly from the sensors 502 and 504 there are a few differences between the two processing units 506 and 1608.

The main differences between the processing unit 1608 and the processing unit 506 of FIG. 5 are: (i) the processing unit 506 of FIG. 5 is typically implemented using analog components such as amplifiers and phase shifters, whereas the processing unit 1608 is typically implemented digitally by, for example, a digital signal processing (DSP) unit; and (ii) the processing unit 506 of FIG. 5 typically has a fixed configuration (e.g. it typically has a fixed number of amplifiers and phase shifters), whereas the processing unit 1608 of FIG. 16 typically has a flexible configuration. Accordingly, the number of zones and/or the parameters used to mathematically combine the sensor signals may be adaptively adjusted or fine-tuned during flight of the satellite 12' to optimize the detection performance of the satellite 12'.

The receiver 1610 of FIG. 16 corresponds to the receiver 508 of FIG. 5. Specifically, the receiver 1610 receives the plurality of zone signals from the processing unit 1608 and extracts the messages contained therein. The description of the receiver 508 given above with respect to FIG. 5 applies equally to the receiver 1610. For example, the receiver 1610 may be a standard AIS receiver, such as the EURONAV™ AI3000 or the Smart Radio Holdings Limited™ SR162 Professional AIS Receiver, or a proprietary receiver, such as that described in U.S. Published Patent Application No. 2008/0304597 to Peach.

The transmitter unit 1612 of FIG. 16 corresponds to the transmitter unit 510 of FIG. 5. Specifically, the transmitter unit 1612 receives the messages from either the receiver 1610 or the screening unit 1616 (depending on whether the LEO satellite 12' includes a screening unit 1616) and transmits or downlinks them to the ground station. The description of the transmitter unit 510 given above with respect to FIG. 5 applies equally to the transmitter unit 1612. For example, the transmitter unit 1612 typically includes a modulator (not shown) and a transmitter antenna (not shown).

The controller 1614 of FIG. 16 corresponds to the controller 512 of FIG. 5. Specifically, the controller 1614 selects the mathematical combinations and supplies them to the processing unit 1608. The description of the controller 512 given above with respect to FIG. 5 applies equally to the controller 1614. For example, like the controller 512 of FIG. 5, the controller 1614 of FIG. 16 may, for example, select the mathematical combinations based on the trajectory of the LEO satellite, or it may adaptively select the mathematical combinations based on the characteristics of the zone signals to improve the detection capability of the LEO satellite 12'.

The screening unit 1616 of FIG. 16 corresponds to the screening unit 514 of FIG. 5. Specifically, the screening unit 1616 receives the plurality of messages extracted by the receiver 1610 and eliminates any duplicate messages. The description of the screening unit 514 given above with respect to FIG. 5 applies equally to the screening unit 1616. For example, the screening unit 1616, like screening unit 514, typically sorts the messages in time order and eliminates any duplicate messages.

Figure 17:
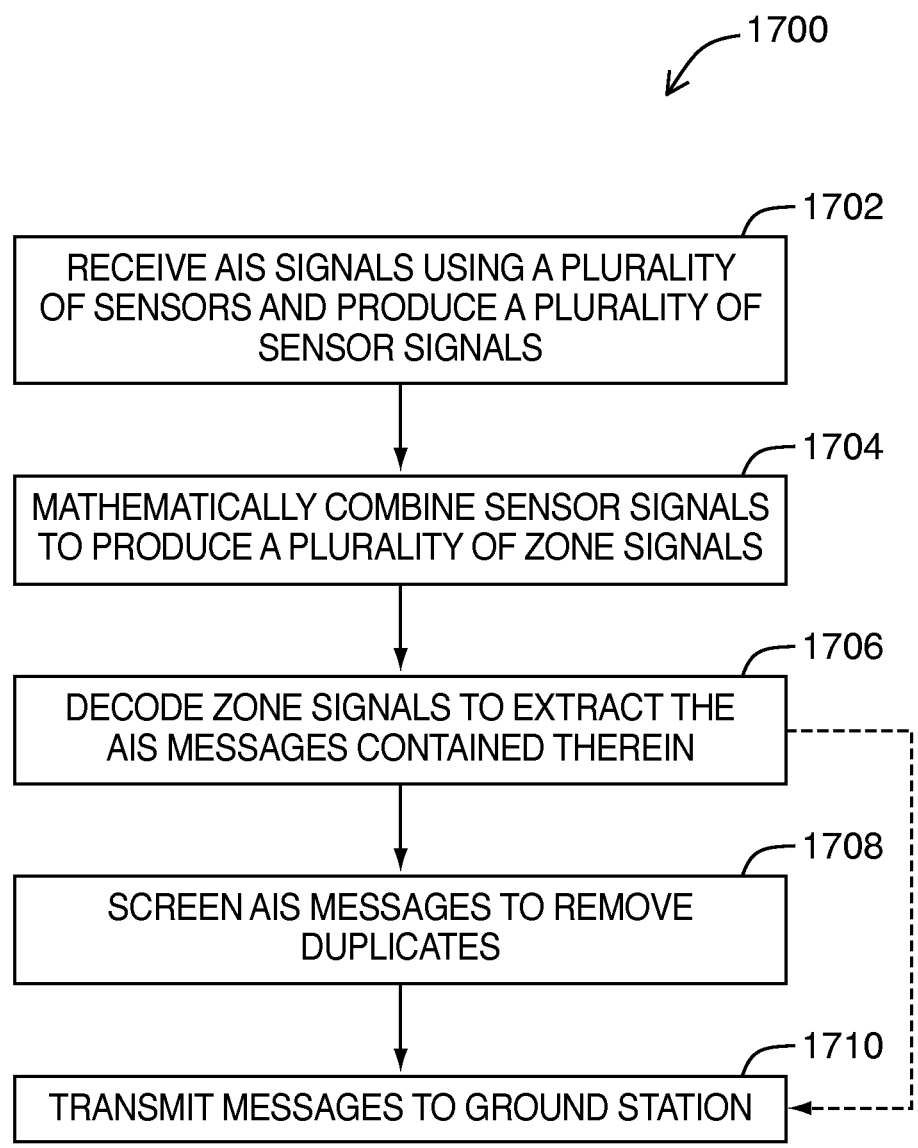
FIG. 17 is a flowchart diagram of a method for segmenting a low earth orbit satellite field of view in accordance with at least one embodiment.

Reference is now made to FIG. 17, which is a flowchart that illustrates a method 1700 of segmenting a LEO satellite FOV for receiving radio frequency signals in accordance with an embodiment. At (1702) a plurality of AIS signals are received at the LEO satellite by a plurality of sensors, such as sensors 502 and 504 or sensors 1602 and 1604. Each sensor then outputs a sensor signal representative of the received AIS signals. The method 1700 then proceeds to (1704).

At (1704) the plurality of sensor signals are mathematically combined to produce a plurality of zone signals. As described above, the phrase "mathematical combination" is used herein to describe a simple mathematical combination of two or more sensor signals. Each mathematical combination may be formed by (i) weighting or amplifying one or more of the sensor signals; and/or (ii) adjusting the phase of one or more of the sensor signals; and/or (iii) applying a delay to one or more of the sensor signals; and/or (iv) applying a transfer function to one or more of the sensor signals; and (v) summing the amplified, phase shifted, delayed, and/or transferred sensor signals to produce a zone signal.

Each zone signal represents a portion of the FOV of the LEO satellite. In one embodiment, each zone signal represents a zone and the area of the zone is less than the area of the FOV. Accordingly, in this embodiment, the zone signals segment the FOV of the LEO satellite into a plurality of smaller zones.

The mathematical combinations may be fixed or may be adaptively selected based on (i) the trajectory of the satellite; and/or (ii) the characteristics of the zone signals. Methods for adaptively selecting the mathematical combinations have been described in detail above with respect to FIG. 5.

The sensor signals may be mathematically combined by a processing unit, such as processing unit 506 or processing unit 1608. Once the plurality of sensor signals have been mathematically combined to produce the plurality of zone signals, the method 1700 proceeds to (1706).

At (1706), the plurality of zone signals are decoded to extract the AIS messages contained therein. The plurality of zone signals are typically decoded by a receiver, such as receiver 508 or receiver 1610. In some embodiments, the zone signals are processed in parallel, each zone signal being processed by a separate receiver. In other embodiments, a single receiver sequentially processes the zone signals.

Once the plurality of zone signals have been decoded, the method 1700 may proceed to (1708) or (1710) depending on whether the LEO satellite includes a screening unit, such as screening unit 514 or screening unit 1616. If the LEO satellite includes a screening unit, the method 1700 typically proceeds to (1708). If the LEO satellite does not include a screening unit, the method 1700 typically proceeds directly to (1710).

At (1708) the AIS messages decoded at (1706) are filtered or screened to remove any duplicates. In some embodiments, the AIS messages may be time-ordered to identify any duplicates. Once the duplicates are identified the message list is modified so that there are no duplicates. This may involve removing the duplicates or combining duplicate messages to get an improved message. This process has been described above in detail in relation to FIG. 5. The screening may be performed by a screening unit, such as screening unit 514 or screening unit 1616. Once the messages have been screened the method 1700 proceeds to (1710).

At (1710) the messages are transmitted to a ground station (i.e. ground station 14). A method for transmitting the messages to a ground station has been described in detail in reference to FIG. 5. The transmission may be performed by a transmitter unit, such as transmitter unit 510, or transmitter unit 1612. Once the messages have been transmitted, the method 1700 is complete.

While the methods and systems described herein have been discussed as methods and systems for receiving AIS signals at a LEO satellite, it will be evident to a person of skill in the art that the methods and systems described herein may also be used to transmit AIS or AIS-like signals from a LEO satellite.

Specifically, a reverse process may be used to transmit a message back to the same zone in which a message was received. For example, once a particular set of mathematical combinations has been selected, those mathematical combinations can be reversed to send a message back to a particular zone or zones defined by the mathematical combinations. It should be noted, however, that due to the speed at which a typical LEO satellite (i.e. LEO satellite 12 or LEO satellite 12') moves over the earth, a particular set of mathematical combinations is typically only valid for a short period of time (i.e. seconds to a minute). Using such a reverse process allows one to achieve the same performance advantage of the forward direction (earth to LEO satellite) in the return direction (LEO satellite to earth).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A satellite system for detecting radio frequency signals from space, the system comprising:
 a) at least two sensors, each sensor configured to:
  (i) receive a plurality of radio frequency signals, each radio frequency signal comprising at least one message; and
  (ii) output a sensor signal that is representative of the plurality of radio frequency signals;
 b) a controller configured to:
  (i) select a predetermined number of mathematical combinations of the sensor signals;
 c) a processing unit that:
  (i) receives the sensor signals; and
  (ii) produces a plurality of zone signals based on the sensor signals and the predetermined number of mathematical combinations, each zone signal covering a zone that is a portion of the field of view of the satellite system;
 d) at least one receiver configured to extract the at least one message contained in the zone signals; and
 e) a screening unit coupled to the at least one receiver, the screening unit comprising a processor, with memory and instructions, configured to eliminate duplicate messages and decimate non-duplicate messages from the same source.

2. The satellite system of claim 1, wherein each of the zone signals is at least partially statistically independent from the other zone signals.

3. The satellite system of claim 1, wherein the controller is further configured to adaptively select the mathematical combinations based on (1) at least one of the following: (a) total signal power of at least one zone signal, (b) bandwidth variations of at least one zone signal, (c) the amplitude distribution of at least one zone signal, (d) the phase distribution of at least one zone signal, (e) an eye diagram of at least one zone signal, (f) the phase trajectory of at least one zone signal, (g) cross-correlation of at least two zone signals, (h) cross covariance of at least two zone signals, and (i) coherency analysis of at least one zone signal, (2) selected time segments of the zone signal, representing one or more message segments, (3) the number of messages extracted from at least one zone signal, and (4) the error rate of at least one zone signal.

4. The satellite system of claim 1, wherein the controller is further configured to select the mathematical combinations from a predefined list of mathematical combinations.

5. The satellite system of claim 1, wherein the screening unit is further configured to select a particular duplicate message for elimination based on the bit error rate of the particular duplicate message.

6. The satellite system of claim 1, wherein the screening unit is further configured to select a particular duplicate message for elimination based on historical data related to the source of the duplicate message.

7. The satellite system of claim 1, further comprising a memory unit configured to store the zone signals prior to sequential processing of the zone signals by the at least one receiver.

8. The satellite system of claim 7, further comprising at least one analog to digital converter configured to convert the zone signals into digital zone signals, the digital zone signals being stored in the memory unit.

9. The satellite system of claim 1, further comprising a plurality of receivers, each receiver configured to extract the at least one message contained in one of the zone signals.

10. The satellite system of claim 1, wherein the at least two sensors have different polarizations.

11. The satellite system of claim 1, wherein the at least two sensors have a field of view and the coverage of each zone signal is less than the field of view of the satellite.

12. The satellite system of claim 1, wherein each sensor is configured to receive radio frequency signals that are automatic identification system (AIS) signals.

13. The system of claim 12, wherein each zone of the zone signals produced by mathematically combining the sensor signals have a number of ships less than a receiver detection threshold.

14. The system of claim 13, wherein the receiver detection threshold is in a range of 800 to 1000 ships.

15. The satellite system of claim 1, wherein the at least two sensors are chosen from monopole antennas, patch antennas, helical antennas or a combination thereof.

16. A method for detecting radio frequency signals from space using a satellite, the method comprising:
 a) each of a plurality of sensors receiving a plurality of radio frequency signals, each radio frequency signal comprising at least one message;
 b) each of the plurality of sensors outputting a sensor signal representative of the received plurality of radio frequency signals;
 c) selecting by a controller a predetermined number of mathematical combinations of the sensor signals;
 d) combining by a processing unit the sensor signals into the predetermined number of mathematical combinations to produce a plurality of zone signals, each zone signal covering a zone that is a portion of the field of view of the satellite system;
 e) extracting by a receiver the at least one message contained in the zone signals; and
 f) decimating non-duplicate messages from the same source.

17. The method of claim 16, wherein each of the zone signals is at least partially statistically independent from the other zone signals.

18. The method of claim 16, wherein the mathematical combinations are adaptively selected based on (1) at least one of: (a) total signal power of at least one zone signal, (b) bandwidth variations of at least one zone signal, (c) the amplitude distribution of at least one zone signal, (d) the phase distribution of at least one zone signal, (e) an eye diagram of at least one zone signal, (f) the phase trajectory of at least one zone signal, (g) cross-correlation of at least two zone signals, (h) cross covariance of at least two zone signals, and (i) coherency analysis of at least one zone signal, (2) selected time segments of the zone signal, representing one or more message segments, (3) the number of messages extracted from at least one zone signal, and (4) the error rate of at least one zone signal.

19. The method of claim 16, wherein the mathematical combinations are selected from a predefined list of mathematical combinations.

20. The method of claim 16, further comprising eliminating duplicate messages.

21. The method of claim 20, wherein a particular duplicate message is selected for elimination based on the bit error rate of the particular duplicate message.

22. The method of claim 20, wherein a particular duplicate message is selected for elimination based on historical data related to the source of the duplicate message.

23. The method of claim 16, wherein the zone signals are sequentially processed by a single receiver to extract at least one message contained therein.

24. The method of claim 16, wherein the zone signals are concurrently processed by a plurality of receivers to extract the at least one message contained therein.

25. The method of claim 16, wherein the at least two sensors have different polarizations.

26. The method of claim 16, wherein the satellite has a field of view and the coverage of each zone signal is less than the field of view of the satellite.

27. The method of claim 16, wherein the radio frequency signals are automatic identification system (AIS) signals.

28. The method of claim 27, wherein each zone of the zone signals produced by mathematically combining the sensor signals have a number of ships less than a receiver detection threshold.

29. The method of claim 28, wherein the receiver detection threshold is in a range of 800 to 1000 ships.

30. The method of claim 16, wherein the plurality of sensors are chosen from monopole antennas, patch antennas, helical antennas or a combination thereof.

31. A satellite system for detecting radio frequency signals to produce a plurality of zone signals, the system comprising:
 a) at least two sensors, each sensor configured to:
  (i) receive a plurality of radio frequency signals, each radio frequency signal comprising a plurality of messages, the radio frequency signals being automatic identification system (AIS) signals sent by ships; and
  (ii) output a sensor signal that is representative of the received plurality of radio frequency signals;
 b) a processing unit that:
  (i) receives the sensor signals;
  (ii) produces a plurality of zone signals representing zones that segment the field of view of the satellite system based on the sensor signals and an initial set of mathematical combinations of the scanned signals; and
  (iii) produces a plurality of zone signals representing zones having adjusted characteristics based on the sensor signals and adjusted mathematical combinations of the scanned signals;
 c) a controller configured to:
  (i) adaptively select the adjusted mathematical combinations based on characteristics of the zone signals produced by the processing unit; and
  (ii) output a control signal relaying the adaptively selected adjusted mathematical combinations to the processing unit; and
 d) at least one receiver configured to extract one or more of the plurality of messages contained in the zone signals produced by combining the sensor signals into the adjusted mathematical combinations;
 wherein each zone of the zone signals that are produced by mathematically combining the sensor signals have a number of ships less than a receiver detection threshold.

32. The satellite system of claim 31, wherein the controller is configured to adaptively select the adjusted mathematical combinations based on at least a number of messages extracted from at least one zone signal.

33. The satellite system of claim 31, wherein the controller is configured to adaptively select the adjusted mathematical combinations based on at least one of a number of messages extracted from at least one zone signal; total power of the zone signals; bandwidth variations of at least one zone signal, amplitude distribution of at least one zone signal; time slot boundaries; phase distribution of at least one zone signal; error rate of at least one zone signal; an eye diagram of at least one zone signal; phase trajectory of at least one zone signal; cross-correlation of at least two zone signal; cross covariance of at least two zone signals; and coherency analysis of at least one zone signal.

34. The system of claim 31, wherein the at least two sensors are chosen from monopole antennas, patch antennas, helical antennas or a combination thereof.

35. The system of claim 31, wherein the receiver detection threshold is in a range of 800 to 1000 ships.

* * * * *